US012717520B2

(12) United States Patent
Bert

(10) Patent No.: US 12,717,520 B2
(45) Date of Patent: Aug. 25, 2026

(54) PREFETCHING DATA FOR SUBMISSION QUEUES IN COMMUNICATIONS BETWEEN A MEMORY SUB-SYSTEM AND A HOST SYSTEM

(71) Applicant: Micron Technology, Inc., Boise, ID (US)

(72) Inventor: Luca Bert, Bologna (IT)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/815,178

(22) Filed: Aug. 26, 2024

(65) Prior Publication Data

US 2026/0056681 A1 Feb. 26, 2026

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0673* (2013.01)

(58) Field of Classification Search
CPC .. G06F 12/0862; G06F 3/0659; G06F 3/0611; G06F 3/0656; G06F 3/0673
See application file for complete search history.

(56) References Cited

U.S. PATENT DOCUMENTS 10,725,781 B1 * 7/2020 Avraham ............ G06F 12/0868
10,846,226 B2 * 11/2020 Navon .................. G06F 9/3832
11,379,372 B1 * 7/2022 Mukherjee .......... G06F 9/30047
12,346,260 B2 * 7/2025 Suzuki ................ G06F 12/0862
2016/0328358 A1 11/2016 Helgesen et al.
2016/0378353 A1 12/2016 Schmisseur et al.
2017/0060422 A1 * 3/2017 Sharifie ................. G06F 3/0659
2020/0201571 A1 6/2020 Jung et al.
2021/0174224 A1 * 6/2021 Sharon .................. G06F 3/0613
2022/0035564 A1 2/2022 Vikram Singh et al.
2022/0035738 A1 * 2/2022 Brandt ................ G06F 13/4282
2022/0083271 A1 3/2022 Cho
2022/0107757 A1 * 4/2022 Byun .................... G06F 3/0659
2024/0289052 A1 * 8/2024 Parry .................... G06F 3/0679

OTHER PUBLICATIONS

International Search Report and Written Opinion, PCT/US2025/042644, mailed on Dec. 18, 2025.

* cited by examiner

*Primary Examiner* — Khoa D Doan
(74) *Attorney, Agent, or Firm* — Greenberg Traurig

(57) ABSTRACT

A memory sub-system, including: a random access memory; a storage medium having a storage capacity accessible to a host system through commands communicated via a plurality of submission queues to the memory sub-system; and a controller. The controller is configured to: retrieve, from a first submission queue among the plurality of submission queues, a first command configured with a first address to access the storage medium; determine, based at least in part on the first command, that a second address configured in a second command following the first command in communication via the first submission queue from the host system to the memory sub-system is predictable; predict a third address according to the first address configured in the first command; and retrieve, from the storage medium and according to the third address, a data chunk into the random access memory, before the second command is retrieved.

17 Claims, 18 Drawing Sheets

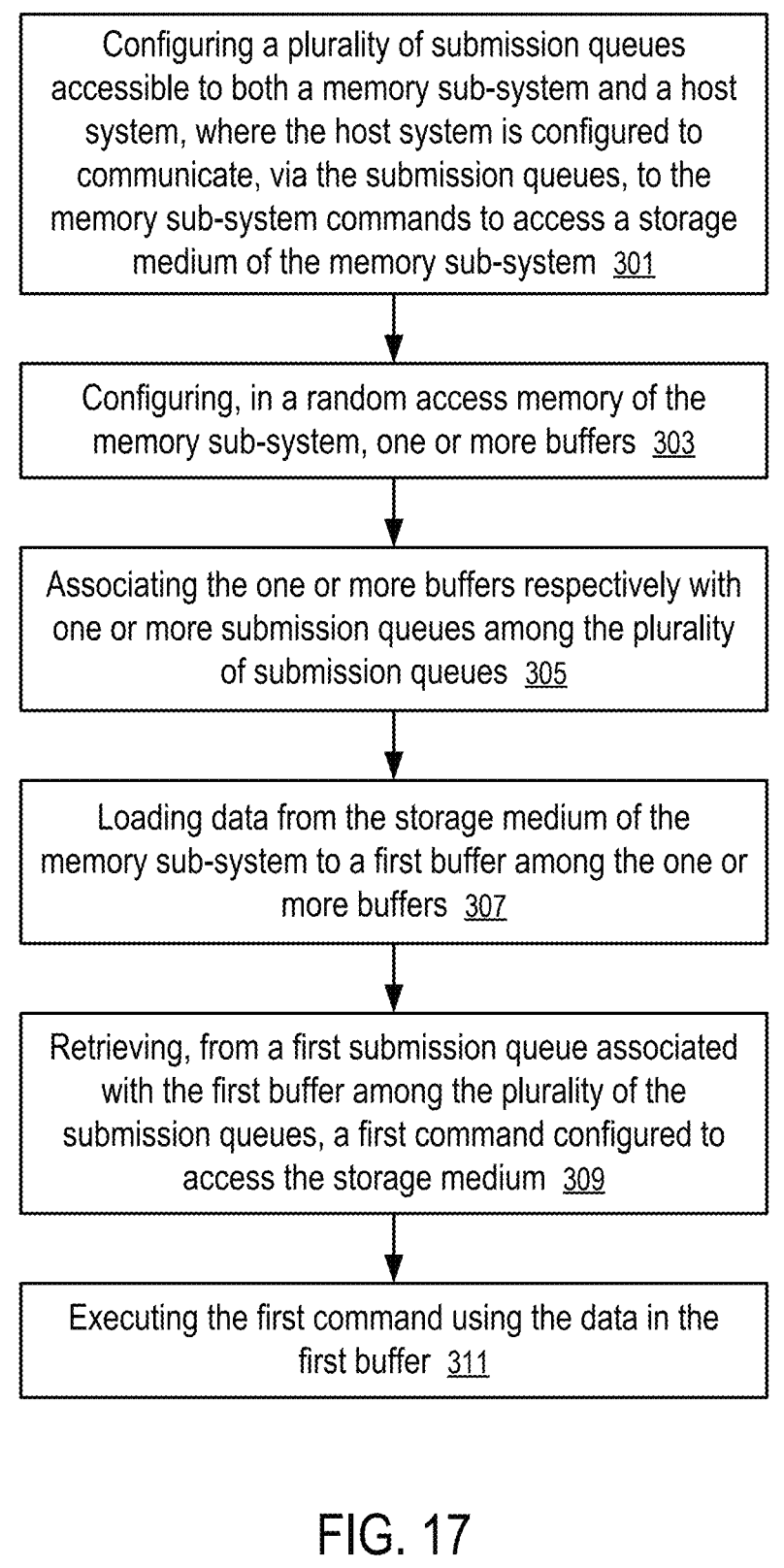

Configuring a plurality of submission queues accessible to both a memory sub-system and a host system, where the host system is configured to communicate, via the submission queues, to the memory sub-system commands to access a storage medium of the memory sub-system 301

Configuring, in a random access memory of the memory sub-system, one or more buffers 303

Associating the one or more buffers respectively with one or more submission queues among the plurality of submission queues 305

Loading data from the storage medium of the memory sub-system to a first buffer among the one or more buffers 307

Retrieving, from a first submission queue associated with the first buffer among the plurality of the submission queues, a first command configured to access the storage medium 309

Executing the first command using the data in the first buffer 311

FIG. 17

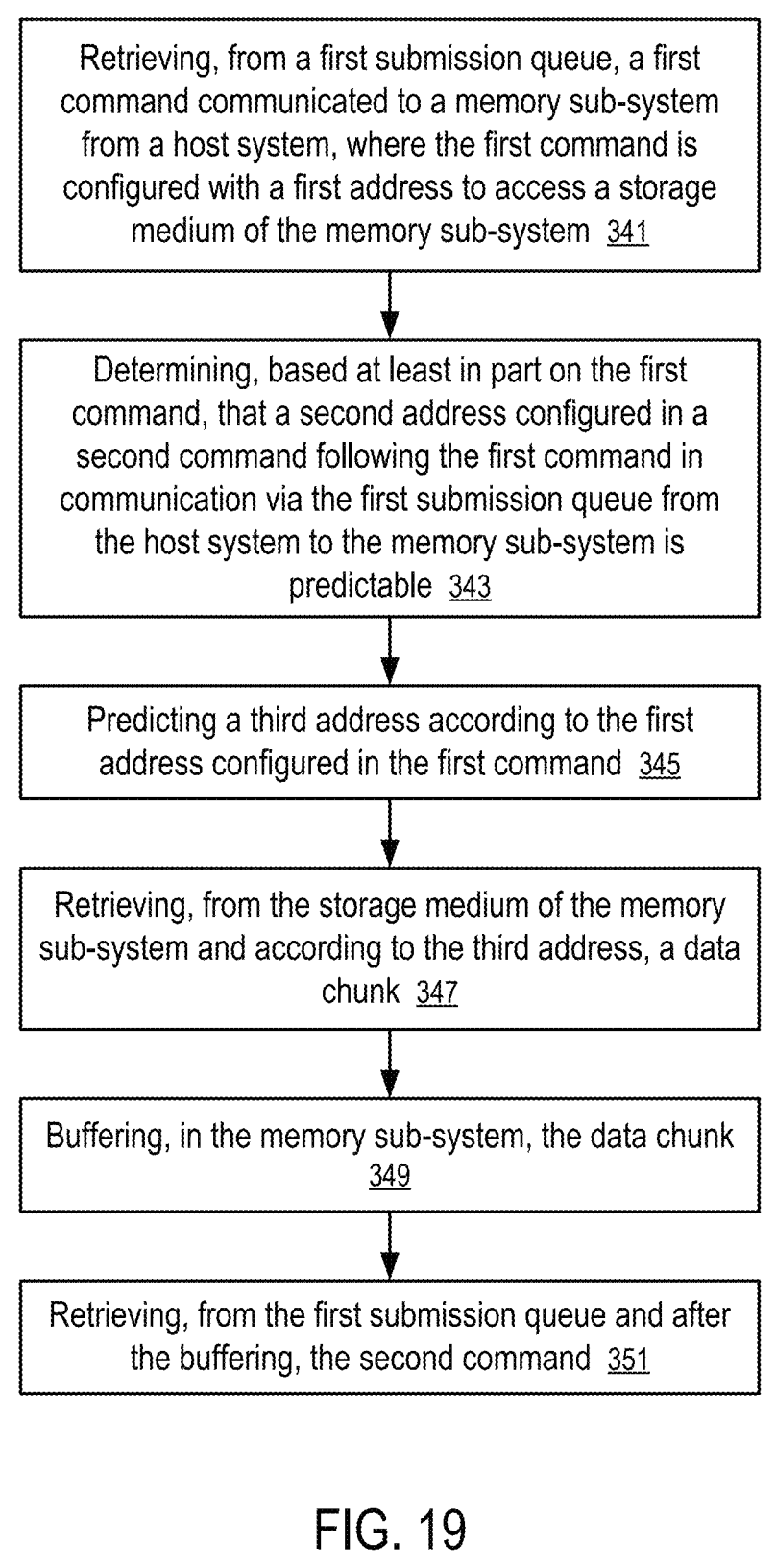

Retrieving, from a first submission queue, a first command communicated to a memory sub-system from a host system, where the first command is configured with a first address to access a storage medium of the memory sub-system 341

Determining, based at least in part on the first command, that a second address configured in a second command following the first command in communication via the first submission queue from the host system to the memory sub-system is predictable 343

Predicting a third address according to the first address configured in the first command 345

Retrieving, from the storage medium of the memory sub-system and according to the third address, a data chunk 347

Buffering, in the memory sub-system, the data chunk 349

Retrieving, from the first submission queue and after the buffering, the second command 351

FIG. 19

PREFETCHING DATA FOR SUBMISSION QUEUES IN COMMUNICATIONS BETWEEN A MEMORY SUB-SYSTEM AND A HOST SYSTEM

TECHNICAL FIELD

At least some embodiments disclosed herein relate to memory systems in general, and more particularly, but not limited to execution of commands provided by host systems to memory sub-systems via submission queues.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 16 to FIG. 19 show methods to manage buffers for submission queues according to one embodiment.

DETAILED DESCRIPTION

Figure 1:
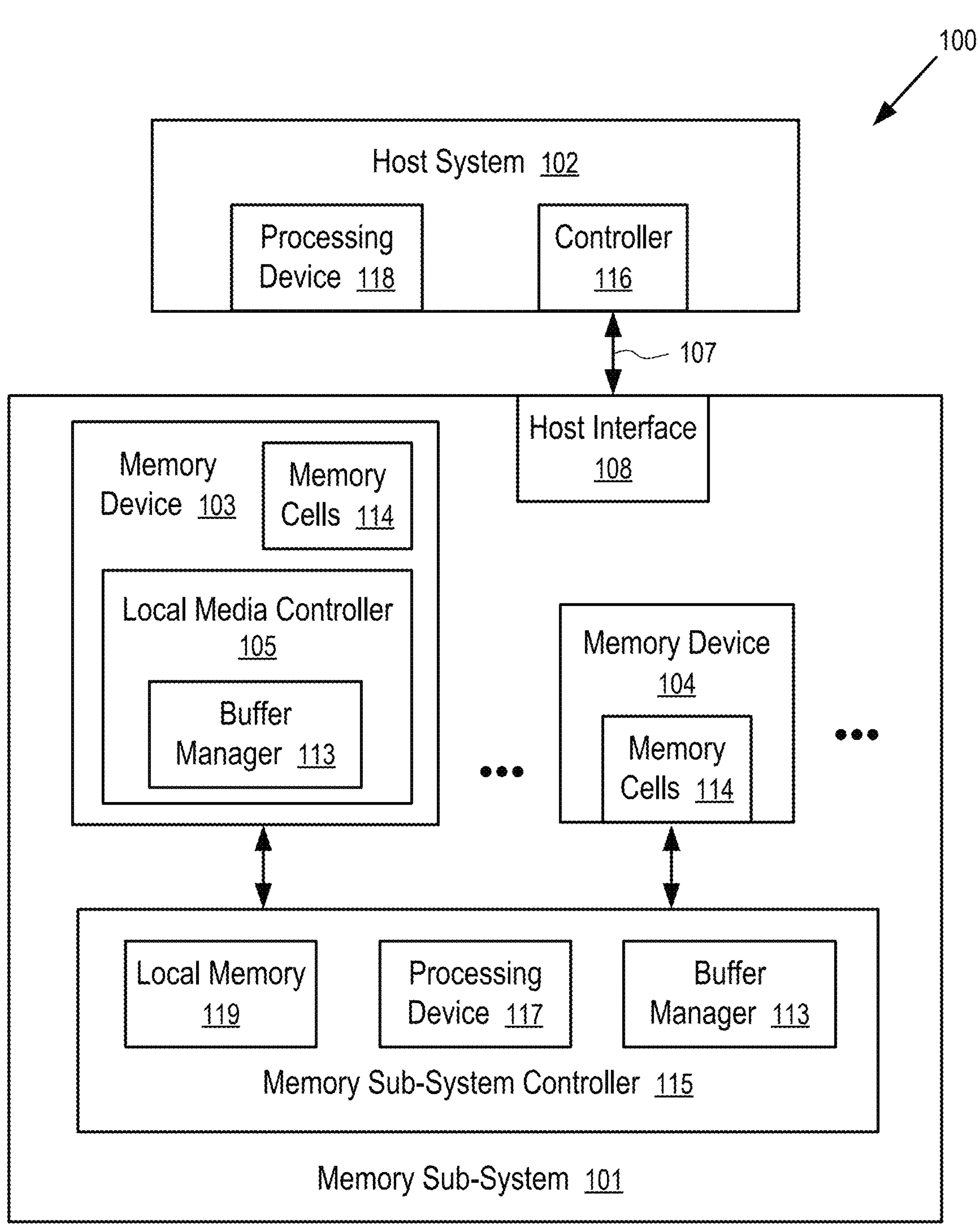
FIG. 1 illustrates an example computing system having a host system and a memory sub-system configured in accordance with some embodiments of the present disclosure.

At least some aspects of the present disclosure are directed to techniques to manage buffers for data to be communicated in response to commands sent from a host system, via submission queues, to a memory sub-system. For example, the memory sub-system can predict, in some instances, which address the host system is going to read next. The prediction can be based on a sequential, or near sequential, pattern of addresses accessed by the host system using commands communicated to the memory sub-system via a submission queue. Based on the prediction, the memory sub-system can start, before the host system provides the next command, prefetching the data according to the predicted address from a storage medium. The prefetched data is stored into a buffer that is assigned particularly to the submission queue. When the host system sends the next command using the submission queue to read from the predicted address, the memory sub-system can generate a response using the data that is in the buffer as a result of the prefetching. Using the data in the buffer to generate the response can be faster than generating the response by starting, after receiving the next command, to retrieve/fetch the data from the storage medium according to the address provided in the next command.

Consider, for example, the data access involved in the training of an artificial neural network (ANN). A computing system configured to perform the training can read large chunks of data from source files and feed the data chunks to one or more graphics processing units (GPUs) programmed to perform computations for the training (e.g., to generate weights of the ANN).

Each of the source files can be a document having a large size (e.g., 16 MB) that is not read all at once for processing. A typical document is partitioned into chunks, each having a smaller size (e.g., 128 KB). Many files can be read in parallel. In some instances, there can be hundreds of files that are open concurrently for access from a memory sub-system (e.g., solid-state drive (SSD)). The requests to access the files may not have an apparent order. For example, to avoid biasing in training, reads of data chunks can be randomized across files, which can make it difficult to predict which file is to be read for the next data chunk for processing. Further, chunks may be read from a document out-of-order and cross-fed to GPUs to further reduce biasing. Amounts of data to be read via different submission queues can vary widely, depending on the current processing tasks of the GPUs that use the submission queues to send access requests to the memory sub-system (e.g., solid-state drive (SSD)).

In such a context, it is challenging to configure the memory sub-system (e.g., solid-state drive (SSD)) to meet desirable performance criteria, such as maximized bandwidth usage, minimized access latency, etc.

To maximize bandwidth usage, the memory sub-system is to operate in a way to fully utilize and thus saturate its available connection bandwidth to a computer bus. For example, when the memory sub-system is connected via a peripheral component interconnect express (PCIe) connection to its host system, it is desirable that when there is a sufficiently large number of commands for processing by the memory sub-system, the memory sub-system can delivery data to the host system at the rate corresponding to the communication bandwidth offered by the PCIe connection.

To minimize latency, the memory sub-system is to operate in a way to deliver data chunks to the host system in shortest time possible from the time of the host system requesting for the data chunks.

However, submission queues for sending access commands to the memory sub-system do not always have a sufficient large number of commands to allow a conventional solid-state drive (SSD) to respond in a way that fully utilizes the communication bandwidth of the PCIe connection to its host system. When the number of pending commands in the submission queue(s) is small, a conventional solid-state drive (SSD) can experience a period of high performance (e.g., with the PCIe bandwidth being fully utilized) followed by a period of low performance.

Further, latency of a conventional solid-state drive (SSD) tends to be high, since the SSD is configured to retrieve data from NAND memory devices via backend reads, which can be slow for the computing threads running in the GPUs and asking for the data. The low latency can have a blocking effect for other threads that are competing to access the same NAND memory devices configured in the SSD. The effect may vary with queue depths, but traffic on multiple threads generally has a marked negative effect on latency.

At least some aspects of the present disclosure address the above and other deficiencies and challenges by implementing an effective prefetch mechanism. The mechanism allows minimizing read latency of, and maximizing bandwidth utilization by, a memory sub-system used in a highly threaded environment with variable queue depths in submission queues. Examples of such an environment can include computing systems configured to perform computations involving artificial neural network (ANN) and/or artificial intelligence (AI), where computing threads can be started and suspended in unpredictable patterns and where queue depths can widely vary from very low to extremely high.

For example, the effective prefetch mechanism can be implemented in a memory sub-system configured in a form of a storage data processing unit that has a large fast random access memory capacity (e.g., dynamic random access memory (DRAM)) and sufficient computation capabilities. Part of the fast random access memory can be configured to store or buffer data retrieved from its slower storage medium (e.g., NAND memory cells) via speculative prefetching, as further discussed below.

In general, it is possible to configure a generic cache controller in the memory sub-system to cache data that may be accessed by the host system. However, such a solution can be expensive; and most of the features of the generic cache controller would be wasted. The efficient mechanism disclosed herein focuses on the problems in the above discussed highly threaded environment.

A computing system in a highly threaded environment can be configured in a way to simplify the identification of which data belongs to which thread with a reasonable level of accuracy. For example, each processing core in a GPU having multiple processing cores can be assigned a dedicated queue pair, including a submission queue and a completion queue, to access the memory sub-system. Since each processing core is capable of starting a thread that is likely to perform the computations in the processing core continuously for a period of time, it can be assumed with a sufficient level of accuracy that reads coming from the same submission queue (or queue pair) belong to a same thread most of the time.

The memory sub-system can be configured to determine a chunk size for prefetching data from its storage medium (e.g., NAND memory devices) via backend reads. In general, different deployments of ANN/AI computations can have different chunk sizes in read access requests from the host system; and even inside each deployment, different threads can use different read sizes. The memory sub-system can be configured to start with a predetermined size for prefetching data for the different submission queues (or queue pairs), and then adjust the chunk size for each individual submission queue (or queue pair) in view of data being read via commands transmitted via the individual submission queue (or queue pair).

Preferably, the memory sub-system is configured with a sufficient amount of fast random access memory for a majority of run time scenarios and thus avoid the use of a theoretically maximum amount of fast random access memory (e.g., a predetermined amount of buffer space for each submission queue and for the maximum number of submission queues that can be used by the memory sub-system), which can be excessive and can lead to a reduced utilization rate of the fast random access memory.

For example, each submission queue can be configured with a buffer to store a predetermined number (e.g., 4) of prefetched chunks. When the chunk size of each prefetched chunk is 128 KB, the buffer is to have a size that is a multiple of the chunk size (e.g., 4*128 KB=512 KB). Since the memory sub-system is configured to support up to a number of submission queues (e.g., 2048), the theoretically maximum memory size needed for the prefetch buffers can be large (e.g., 2048*512 KB=1 GB). However, it is unnecessary to configure a random access memory of the theoretically maximum size in the memory sub-system, because it is unlikely that the entire set of submission queues are to require concurrently prefetching. When a dynamic allocation technique (e.g., as discussed below) is used, a fraction (e.g., 10% to 20%) of the theoretical maximum memory size can be sufficient.

When a dynamic allocation technique is implemented, the memory sub-system can allocate a prefetch buffer to a submission queue when the submission queue is in a prefetching mode and deallocate the buffer from the submission queue when the submission queue is not in the prefetching mode. For example, the memory sub-system can be configured to check whether the addresses access in the submission queue has a pattern (e.g., accessing data chunks sequentially according to logical block addressing (LBA) addresses) that can be used to predict the address to be accessed next. When the pattern is detected and/or confirmed, a prefetching mode can be turned on for the submission queue; and a prefetch buffer can be allocated for the submission queue. When no pattern is detected and/or a previous prediction is invalidated by the current command received via the submission queue, the prefetching mode can be turned off for the submission queue; and the fast random access memory allocated to implement the prefetch buffer of the submission queue can be deallocated and used for another submission queue. In some implementations, following an initial access made via a submission queue, the subsequent accesses made via the submission queues can be assumed to be sequential (or near sequential); and thus, in view of the initial access, the prefetching mode can be turned on. If a subsequent access is actually sequential or near sequential, the prefetching mode is kept on. However, when a subsequent access is found to be outside of the set of addresses of the prefetched chunks (e.g., 4 chunks), the memory sub-system can turn off the prefetching mode for the submission queue.

The memory sub-system can be configured to dynamically adjust the size of the prefetch buffer allocated to a submission queue. For example, the chunk size can be initially set at a predetermined size (e.g., 128 KB) and stored as part of the metadata of the prefetch buffer allocated to the submission queue. The memory sub-system can monitor the size of data read via each read command retrieved from the submission queue. If the data size of the read command remains the same as the chunk size recorded in the metadata of the buffer, the memory sub-system does not change the chunk size for the allocation of memory for the buffer. When the submission queue receives a read command having a different data size, the memory sub-system can adjust the buffer size by changing the chunk size for memory allocation according to the new data size of the read command.

In some implementations, when data size of read commands becomes smaller than the predetermined size (e.g., 128 KB), the memory sub-system is configured to use the predetermined size (e.g., 128 KB) as the chunk size. When the data size of read commands is larger, or significantly larger, than the predetermined size, the memory sub-system is configured to round up the data size to a next multiple of the predetermined size and change the chunk size to the next multiple of the predetermined size.

For example, the memory sub-system can maintain a pool of buffer units each having the same predetermined size (e.g., 4*128 KB=0.5 MB). When the data size of read commands is larger than the predetermined size but no larger than twice the predetermined size, the memory sub-system can allocate two buffer units that are concatenated to form the prefetch buffer allocated to the submission queue. The new chunk size can be recorded in the metadata of the buffer. When the dynamic sizing of prefetch buffers is performed using such a technique, buffer management operations can be simplified.

Typically, when a thread uses a submission queue to send commands to access data in the memory sub-system, the thread uses a same data size for read commands for a period of time. However, when one thread completes its computations (or is suspended after the period of time), another thread can start or resume its operations (e.g., in a same processing core of a GPU) that use the same submission queue to access data in the memory sub-system. Thus, the data size of read commands in a submission queue can change over time; and the memory sub-system is configured to monitor the data sizes of read commands to detect changes. Optionally, the memory sub-system can use a change in data size of read commands communicated via the submission queue as an indication of a change in the computing thread that is requesting for the data. When a thread starts or restarts its data access made via the submission queue, the memory sub-system can turn on the prefetching mode, which continues until a subsequent access is found to be outside of a range that is predicted according to the sequential access pattern.

In general, some sequences of read commands can support a prefetching logic, while other sequences of read commands may not follow a pattern that can be used to implement effective prefetching. The memory sub-system can be configured to assume initially that the read commands in a submission queue are from a same thread to access data sequentially. Thus, the memory sub-system can turn on the prefetching mode for the submission queue to prefetch a predetermined number (e.g., 4) of data chunks according to the address of the data chunk currently being accessed. If the next read command accesses one of the predetermined number of data chunks (e.g., four chunks), the memory sub-system can keep the prefetching mode on for the submission queue to have the next four chunks in the prefetch buffer. However, if the next read commands does not access any of the four chunks in the prefetch buffer of the submission queue, the memory sub-system can turn off the prefetching mode for the submission queue and deallocate the buffer previously allocated to the submission queue. Subsequently, the memory sub-system can further monitor the access pattern of the commands in the submission queue. If the access pattern is determined to be sequential (e.g., a chunk accessed next is one of the four chunks predicted according to the chunk accessed previously), the memory sub-system can turn on the prefetching mode.

In some instances, threads can be swapped across processing cores and thus submission queues. To account for such situations, the memory sub-system can be configured to check whether a prefetched chunk is accessed via a next command in a different submission queue. If so, the memory sub-system can use the detection as an indication of a thread being swapped to the different submission queue and adjust the buffering accordingly. For example, some of the buffer units storing data chunks that can be accessed sequentially can be reallocated to the different submission queue with their prefetched content.

At times, read ahead can be out of order, e.g., intentionally or as a result of a command delivery system used in placing the commands into the submission queues failing to keep the order. To account for such situations, the memory sub-system can be configured to prefetch a predetermined number of chunks (e.g., 4 chunks) such that when the read ahead is slightly out of order, a next command for a sequential or near sequential read is likely to be addressing one of the predetermined number of chunks (e.g., 4 chunks). When the next read command requests for one of the prefetched chunks in the buffer, the next access via the submission queue can be considered a sequential access to a chunk following the last chunk in the prefetched chunks in the buffer to perform further prefetching.

For example, chunks may be enumerated as 0, 1, 2, and 3 but may be read slightly out of order 0, 2, 3, and 1 (or similar). Then, with the predetermined number of prefetched chunks in the buffer, the slightly out of order read can still be considered and processed as a sequential read. For example, after the chunk 0 is access, chunk 4 is prefetched such that the prefetch buffer has the chunks 1, 2, 3, and 4. When the next command accesses chunk 2, which is one of the four prefetched chunks, chunk 5 is prefetched such that the prefetch buffer has the chunks 1, 3, 4, and 5. When the next command accesses chunk 3, the access is again seen as a sequential access; and chunk 5 is prefetched such that the prefetch buffer has the chunks 1, 4, 5, and 6. Similarly, after chunk 1 is accessed, the prefetch buffer has the chunks 4, 5, 6, and 7, after prefetching chunk 7 into the prefetch buffer.

Consider, for example, each logical block addressing (LBA) address is configured to address a block of 4 KB data. A chunk number can be configured as the integer portion of an LBA address of a read command divided by 32 to align with a 128 KB boundary (e.g., by right shifting the binary representation of the LBA address to drop the 5 least significant bits). A chunk box can be configured as the integer portion of the chunk number divided by 4 (the predetermined number of chunks for a prefetch buffer) (e.g., by right shifting the chunk number to drop its 2 least significant bits). The chunk box of the next read command is the integer portion of the LBA address of the next read command divided by 128 (=32*4) (e.g., obtained by right shifting the LBA address to drop its 7 least significant bits). If the chunk box of the next read command is equal to the chunk box of the current read command, the access is considered to follow a sequential or near sequential pattern that allow the memory sub-system to turn on, and/or continue the prefetching mode for the submission queue. Otherwise, the prefetching mode can be turned off.

Prefetched data is typically read once and not reused or rewritten. Thus, as soon as a chuck in the prefetch buffer is accessed by the host system, the memory sub-system can free the buffer unit storing the entire chunk and make the freed buffer unit available for prefetching another chunk for the submission queue or another submission queue.

Optionally, a submission queue is idling for a time period of a predetermined length (e.g., being empty and/or not receiving read commands from the host system), the prefetch buffer allocated to the submission queue can be deallocated; and its buffer units can be returned to a pool of free buffer units for reallocation to other submission queues.

In some instances, the host system can write to LBA addresses from which data chunks have been prefetched into prefetch buffers allocated to some of the submission queues. To maintain coherency the memory sub-system can be configured to store data identifying the LBA addresses that have data in the prefetch buffers, and configured to execute write commands targeting such LBA addresses by updating the content in the corresponding prefetch buffers and storing the updated content in the storage medium (e.g., NAND memory devices of the memory sub-system).

FIG. 1 illustrates an example computing system 100 that includes a memory sub-system 101 in accordance with some embodiments of the present disclosure. The memory sub-system 101 can include media, such as one or more volatile memory devices (e.g., memory device 104), one or more non-volatile memory devices (e.g., memory device 103), or a combination of such.

In general, a memory sub-system 101 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 102 that is coupled to one or more memory sub-systems 101. FIG. 1 illustrates one example of a host system 102 coupled to one memory sub-system 101. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 102 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 102 uses the memory sub-system 101, for example, to write data to the memory sub-system 101 and read data from the memory sub-system 101.

The host system 102 can be coupled (e.g., over a computer bus 107) to the memory sub-system 101 via a physical host interface 108. Examples of a physical host interface 108 include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface 108 can be used to transmit data between the host system 102 and the memory sub-system 101. The host system 102 can further utilize an NVM express (NVMe) interface to access components (e.g., memory devices 103) when the memory sub-system 101 is coupled with the host system 102 by the PCIe interface. The physical host interface 108 can provide an interface for passing control, address, data, and other signals between the memory sub-system 101 and the host system 102. FIG. 1 illustrates a memory sub-system 101 as an example. In general, the host system 102 can access multiple memory sub-systems via a same communication connection, multiple separate communication connections, and/or a combination of communication connections.

The processing device 118 of the host system 102 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 102 and the memory sub-system 101. In general, the controller 116 can send commands or requests to the memory sub-system 101 for desired access to memory devices 103, 104. The controller 116 can further include interface circuitry to communicate with the memory sub-system 101. The interface circuitry can convert responses received from the memory sub-system 101 into information for the host system 102.

The controller 116 of the host system 102 can communicate with the controller 115 of the memory sub-system 101 to perform operations such as reading data, writing data, or erasing data at the memory devices 103, 104 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 103, 104 can include any combination of the different types of non-volatile memory components and/or volatile memory components. The volatile memory devices (e.g., memory device 104) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells 114. One type of memory cells, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells 114 of the memory devices 103 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 103 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 103 to perform operations such as reading data, writing data, or erasing data at the memory devices 103 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 101, including handling communications between the memory sub-system 101 and the host system 102.

In some embodiments, the local memory 119 can include memory registers storing memory pointers, fetched data, etc. The local memory 119 can also include read-only memory (ROM) for storing micro-code. While the example memory sub-system 101 in FIG. 1 has been illustrated as including the controller 115, in another embodiment of the present disclosure, a memory sub-system 101 does not include a controller 115, and can instead rely upon external control (e.g., provided by an external host, or by a processor or controller separate from the memory sub-system).

In general, the controller 115 can receive commands or operations from the host system 102 and can convert the commands or operations into instructions or appropriate commands to achieve the desired access to the memory devices 103. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 103. The controller 115 can further include host interface circuitry to communicate with the host system 102 via the physical host interface 108. The host interface circuitry can convert the commands received from the host system into command instructions to access the memory devices 103 as well as convert responses associated with the memory devices 103 into information for the host system 102.

The memory sub-system 101 can also include additional circuitry or components that are not illustrated. In some embodiments, the memory sub-system 101 can include a cache or buffer (e.g., DRAM) and address circuitry (e.g., a row decoder and a column decoder) that can receive an address from the controller 115 and decode the address to access the memory devices 103.

In some embodiments, the memory devices 103 include local media controllers 105 that operate in conjunction with the memory sub-system controller 115 to execute operations on one or more memory cells of the memory devices 103. An external controller (e.g., memory sub-system controller 115) can externally manage the memory device 103 (e.g., perform media management operations on the memory device 103). In some embodiments, a memory device 103 is a managed memory device, which is a raw memory device combined with a local controller (e.g., local media controller 105) for media management within the same memory device package. An example of a managed memory device is a managed NAND (MNAND) device.

The controller 115 and/or a memory device 103 can include a buffer manager 113 configured to perform operations related to the management of buffers allocated to submission queues through which commands are provided from the host system 102 to the memory sub-system 101 for execution. In some embodiments, the controller 115 in the memory sub-system 101 includes at least a portion of the buffer manager 113. In other embodiments, or in combination, the controller 116 and/or the processing device 118 in the host system 102 includes at least a portion of the buffer manager 113. For example, the controller 115, the controller 116, and/or the processing device 118 can include logic circuitry implementing the buffer manager 113. For example, the controller 115, or the processing device 118 (processor) of the host system 102, can be configured to execute instructions stored in memory for performing the operations of the buffer manager 113 described herein. In some embodiments, the buffer manager 113 is implemented in an integrated circuit chip disposed in the memory sub-system 101. In other embodiments, the buffer manager 113 can be part of firmware of the memory sub-system 101, an operating system of the host system 102, a device driver, or an application, or any combination therein.

For example, the buffer manager 113 implemented in the controller 115 and/or 105 of the memory sub-system 101 can be configured to dynamically allocate buffer units from a pool of free buffer units to form prefetch buffers through buffer concatenation. The prefetch buffers can be adapted to service commands of respective submission queues. The prefetch buffers are pre-associated with, allocated to, and/or dedicated to the respective submission queues, as further discussed below.

Figure 2:
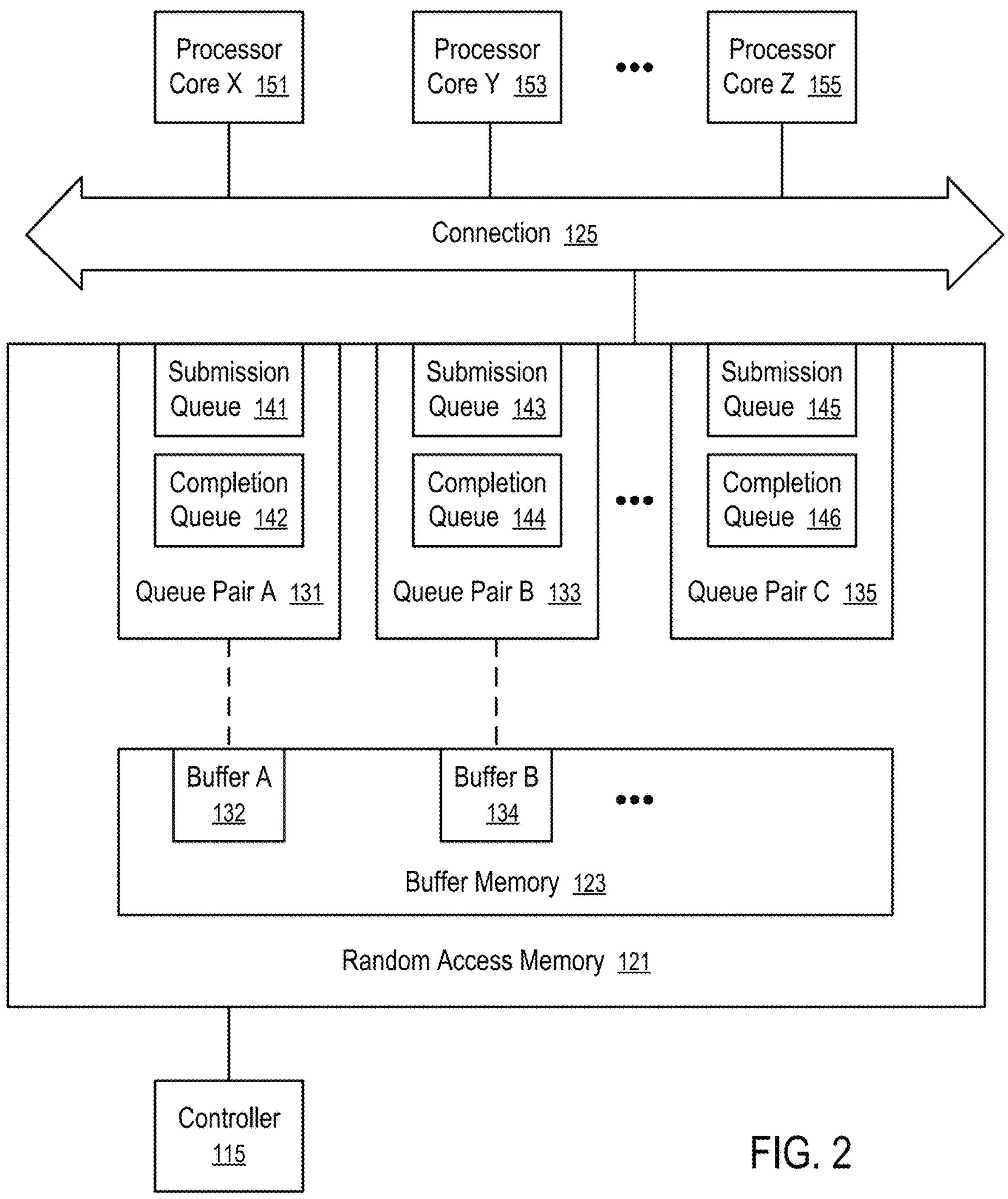
FIG. 2 shows a buffer system configured for submission queues according to one embodiment.

FIG. 2 shows a buffer system configured for submission queues according to one embodiment. For example, the buffer system of FIG. 2 can be used for the executions of commands communicated from a host system 102 to a memory sub-system 101 in the computing system 100 of FIG. 1.

In FIG. 2, the host system 102 can have a plurality of processor cores 151, 153, . . . , and 155 that can provide commands for execution by the controller 115 of the memory sub-system 101 via submission queues 141, 143, . . . , and 145 configured in a random access memory 121. The processor cores 151, 153, . . . , and 155 can access the random access memory 121 via a connection 125 (e.g., a memory bus, a PCIe bus, etc.)

For example, the host system 102 can include a plurality of graphical processing units (GPUs), each having a plurality of GPU cores. The processor cores 151, 153, . . . , and 155 can be GPU cores running computing processes in parallel in an AI application to train an artificial neural network (ANN) using source files stored in the memory sub-system 101. The source files can contain the training dataset for the determination of the weights in the AI/ANN model.

Each of the processor cores 151, 153, . . . , 155 can be assigned a dedicated queue pair (QP) (e.g., 131, 133, or 135). Each of the queue pairs (e.g., 131) can have a submission queue (e.g., 141) for a processor core (e.g., 151) to send commands for execution by the controller 115 of the memory sub-system 101 and a completion queue 142 to receive, from the memory sub-system 101, completion messages about the execution of the commands retrieved from the submission queue (e.g., 141).

At least a portion of the random access memory 121 is accessible to both the processor cores 151, 153, . . . , 155 of the host system 102 and the controller 115 of the memory sub-system 101. The queue pairs 131, 133, . . . , 135 are configured in such a portion of the random access memory 121 such that the host system 102 and the memory sub-system 101 can independently access the message queues (e.g., 141, 143, . . . , 145; 142, 144, . . . , 146).

Each of the queues (e.g., 141, 143, . . . , 145; 142, 144, . . . , 146) can be configured in a circular buffer allocated from the random access memory 121 (e.g., according to a standard of NVMe). For example, the submission queue 141 can be in a circular buffer having a predetermined number of slots for commands, where each slot has a same predetermined size to hold one command. A processor core (e.g., 151) can add one or more commands to the end of a submission queue (e.g., 141) in the circular buffer for retrieval by the controller 115 of the memory sub-system 101 at a time decided by the memory sub-system 101.

The random access memory 121 can further a portion configured as a buffer memory 123. The buffer manager 113 in the memory sub-system 101 can dynamically allocate portions of the buffer memory 123 to form buffers (e.g., 132, 134, etc.) for individual submission queues (e.g., 141, 143, etc.).

For example, the buffer manager 113 is configured to determine whether to turn on a speculative prefetching mode specifically for a submission queue (e.g., 141). If so, the buffer manager 113 can dynamically allocate a buffer (e.g., 132) from the buffer memory 123 and associated the buffer (e.g., 132) specifically with the submission queue (e.g., 141) among the set of submission queues 141, 143, . . . , and 145. The buffer (e.g., 132) is configured to store data specific to the operations of the submission queue (e.g., 141).

Further, the buffer manager 113 is configured to monitor the commands received via the submission queue 141, or the lack of such commands, to determine whether to turn off the speculative prefetching mode for the submission queue 141. In response to a decision to turn off the speculative prefetching mode for the submission queue (e.g., 141), the buffer manager 113 can deallocate the buffer (e.g., 132) that is specifically associated with the submission queue (e.g., 143) among the queue pairs 131, 133, . . . , 135; and the resources of the deallocated buffer (e.g., 132) can be reused to support the operations of another submission queue (e.g., 145).

For example, after a processor core (e.g., 151, or 153) sends an initial read command via its dedicated submission queue (e.g., 141, or 143) to the memory sub-system 101 to read a data chunk, the buffer manager 113 can assume that the processor core (e.g., 151, or 153) using the submission queue (e.g., 141, or 143) is going to read one or more subsequent data chunks. For example, the initial read command can address the data chunk by specifying a starting logical block addressing (LBA) address and a size of the addressed data chunk (e.g., in terms of a number of consecutive LBA addresses following the starting LBA address). A sequential access of a subsequent data chunks can be addressed via a next read command specifying the same chunk size and a next starting LBA address that follows immediately the LBA addresses of the data chunk requested by the initial read command. In anticipation of the next read command in the submission queue (e.g., 141, or 143), the buffer manager 113 can allocate a buffer (e.g., 132 or 134) from the buffer memory 123 and cause the memory sub-system 101 to prefetch the data chunk that is expected to be accessed sequentially by the processor core (e.g., 151, or 153) using the corresponding submission queue (e.g., 141 or 143).

In some implementations, the memory sub-system 101 prefetches into the buffer (e.g., 132 or 134) not only the next data chunk but also a few more data chunks that are expected to be accessed sequentially. Thus, when the sequential access commands communicated via the submission queue is slightly out of order, the data chunks addressed by the next commands retrieved from the submission queue (e.g., 141 or 143) can be found in the buffer (e.g., 132 or 134). Thus, the buffer (e.g., 132 or 134) associated with the submission queue (e.g., 141 or 143) can be configured to have a capacity to hold a predetermined number of data chunks (e.g., 4 data chunks).

If the next command in the submission queue (e.g., 141, or 143) addresses any of the predetermined number (e.g., 4) of data chunks in the buffer (e.g., 132 or 134), the buffer manager 113 can decide that the access via the submission queue (e.g., 141, or 143) is sequential, or near sequential (e.g., with minor disturbance in the order of commands delivered to the submission queue (e.g., 141, or 143)). Thus, the buffer manager 113 can keep the prefetching mode on for the submission queue (e.g., 141, or 143); and the memory sub-system 101 can prefetch, from its storage medium (e.g., NAND memory cells 114), data chunks that have not yet been accessed via the commands received via the submission queue (e.g., 141, or 143).

If the next command in the submission queue (e.g., 141, or 143) does not address any of the predetermined number (e.g., 4) of data chunks in the buffer (e.g., 132 or 134), the buffer manager 113 can decide that the access via the submission queue (e.g., 141, or 143) is no longer sequential or near sequential. Thus, the buffer manager 113 can turn the prefetching mode off for the submission queue (e.g., 141, or 143), and the deallocate the buffer (e.g., 132, or 134) that is specifically associated with the submission queue (e.g., 141, or 143).

When the submission queue (e.g., 141, or 143) has the prefetching mode off and does not have an associated buffer, the buffer manager 113 can monitor the read commands received via the submission queue (e.g., 141, or 143) to detect an occurrence of sequential or near sequential accesses. In such an occurrence, a subsequent access/read command addresses one of the predetermined number (e.g., 4) of the data chunks following a data chunk addressed by an access/read command that is immediately before the subsequent access/read command. In response to the detection of such an occurrence, the buffer manager 113 can allocate a buffer (e.g., 132 or 134) from the buffer memory 123 for the submission queue (e.g., 141 or 143), and turn on the prefetching mode for the submission queue (e.g., 141 or 143).

To turn on the prefetching mode for a submission queue (e.g., 141), the buffer manager 113 can determine the size of the buffer (e.g., 132) for the submission queue (e.g., 141) based on the size of the data chunk currently being addressed by a read command in the submission queue (e.g., 141). The buffer manager 113 can configure the buffer to have the size sufficient to store a predetermined number (e.g., 4) of prefetched data chunks each having the same size as the current data chunk.

The buffer manager 113 can track the data chunk sizes of read commands in the submission queue (e.g., 141) to dynamically adjust the size of the buffer (e.g., 132) that is specifically associated with the submission queue (e.g., 141). In response to detection of a change in the data chunk sizes, the buffer manager 113 can assume that the read command specifying a new size that is different from the access size of the immediately prior read command in the submission queue (e.g., 141) is an initial read command for a new computing task/thread. Thus, the buffer manager 113 can turn on, or keep on, the prefetching mode for the submission queue, even when the read command having the new size does not address a data chunk in a sequential or near sequential pattern following the access of the data chunk by the immediately prior read command. In response to the change in chunk size, the buffer manager 113 can dynamically adjust the size of the buffer 132 according to the new size of the data chunk being requested by the current read command and adjust prefetching according to the starting LBA address and the new chunk size specified in the current read command.

In some implementations, the buffer manager 113 can track a count of consecutive occurrences of sequential or near sequential accesses made via a submission queue (e.g., 141). When the count is above a predetermined threshold, the buffer manager 113 turns on the prefetching mode for the submission queue (e.g., 141), and allocate a buffer (e.g., 132) for the submission queue (e.g., 141).

In some implementations, the buffer manager 113 can track a count of consecutive occurrences of accesses, made via a submission queue (e.g., 141), that are not sequential or near sequential. When the count is above a predetermined threshold, the buffer manager 113 turns off the prefetching mode for the submission queue (e.g., 141) and deallocate the buffer (e.g., 132) of the submission queue (e.g., 141).

In some implementations, a submission queue (e.g., 141, or 143) currently has pending read commands available for execution by the memory sub-system 101; and the memory sub-system 101 is to postpone sending the data as requested by the read commands to the host system 102 (e.g., due to bandwidth restriction in the connection 107 between the memory sub-system 101 and the host system 102). In response, the buffer manager 113 can optionally turn on the prefetching mode for the submission queue (e.g., 141, or 143) to prefetch the data as requested by the pending read commands to the buffer (e.g., 132, or 134) associated with the submission queue (e.g., 141 or 143) for accelerated operations when the pending read commands are executed.

In some implementations, after the memory sub-system 101 executes the last pending read command in a submission queue (e.g., 141, or 143), the buffer manager 113 can determine whether to turn on a speculative prefetching mode for the submission queue (e.g., 141, or 143). The determination can be based on whether the last pending read command is a sequential or near sequential access in relation with the read command before the last pending read command, and/or a count of consecutive occurrences of sequential or near sequential accesses before the last pending read command.

In some implementations, each buffer (e.g., 132, or 134) includes a portion configured to store metadata for the buffer (e.g., 132, or 134), such as the chunk size of the buffer (e.g., 132, or 134), LBA addresses of the data chunks in the buffer (e.g., 132, or 134), etc. Alternatively, the buffer manager 113 is configured to allocate a plurality of metadata slots for the plurality of submission queues 141, 143, . . . , 145 respectively.

Each of the metadata slots is configured to store the data indicative of whether the respective submission queue (e.g., 141) has a buffer (e.g., 132), and the configuration data of the buffer (e.g., 132), such as one or more physical memory addresses of units of memory allocated from the buffer memory 123 for the buffer (e.g., 132), the chunk size of the buffer (e.g., 132), the starting LBA addresses of the data chunks in the buffer (e.g., 132, or 134), etc.

When a read command in a submission queue (e.g., 141) addresses one of the data chunks present in the buffer (e.g., 132), the memory sub-system 101 can respond to the read command using the data chunk in the buffer (e.g., 132), which is faster than reading the storage medium (e.g., NAND memory cells 114) in response to the read command. Thus, the latency of the read access can be improved via the use of the buffer (e.g., 132).

After responding to a command using a data chunk in the buffer 132, the portion of the buffer 132 used to store the data chunk can be reused to buffer a further data chunk prefetched from the storage medium (e.g., NAND memory cells 114).

When a read command in the submission queue (e.g., 141) accesses the data chunk slightly out of order, the remaining data chunks in the buffer (e.g., 132) associated with the submission queue (e.g., 141) can be discontinuous. For example, after data chunks 1, 2, 3, and 4 are prefetched into the buffer (e.g., 132) and a read command accesses data chunk 4, the buffer (e.g., 132) can store data chunks 1, 2, 3 and 5 that are discontinuous in a logical address space that is to be addressed by the read commands in the submission queue (e.g., 141).

In some implementations, when a read command access a data chunk that is in the buffer 132, the buffer manager 113 can optionally further check whether the buffer 132 contains a skipped data chunk that is the predetermined number of chunks (e.g., 4 chunks) before the data chunk currently being addressed in the logical address space. If so, the skipped data chunk can be discarded; and the portion of the buffer storing the skipped data chunk can be reused to buffer a further prefetched data chunk that is one of the predetermined number (e.g., 4) of chunks following the data chunk currently being addressed. For example, after data chunks 1, 2, 3, and 5 are prefetched into the buffer (e.g., 132) and a read command accesses data chunk 5, the buffer (e.g., 132) can store data chunks 1, 2, 3 and 6, where chunk 1 is 4 chunks before the data chunk 5. Thus, the buffer manager 113 can optionally decide to evict data chuck 1 from the buffer (e.g., 132) and prefetch data chunks 2, 3, 6, and 7 in the buffer (e.g., 132).

When one of the submission queues 141, 143, . . . , 145 receives a write command, the memory sub-system 101 is configured to check the metadata to determine whether the write command is to write data to one of the buffers (e.g., 132, 134, . . . ). If so, the memory sub-system 101 is configured to modify the respective buffer using the data to be written according to the write command and then execute the write command by writing from the buffer to the storage medium (e.g., NAND memory cells 114).

In some implementations, the random access memory 121 of FIG. 2 is configured in the host system 102; and the buffer manager 113 in the controller 115 of the memory sub-system 101 is configured to access the queue pairs 131, 133, . . . , 135 and the buffer memory 123 over a connection (e.g., a computer bus 107, such as a PCIe bus) between the host system 102 and the memory sub-system 101. In such a configuration, speculative prefetching into the buffer memory 123 can increase the traffic over the connection.

Figure 3:
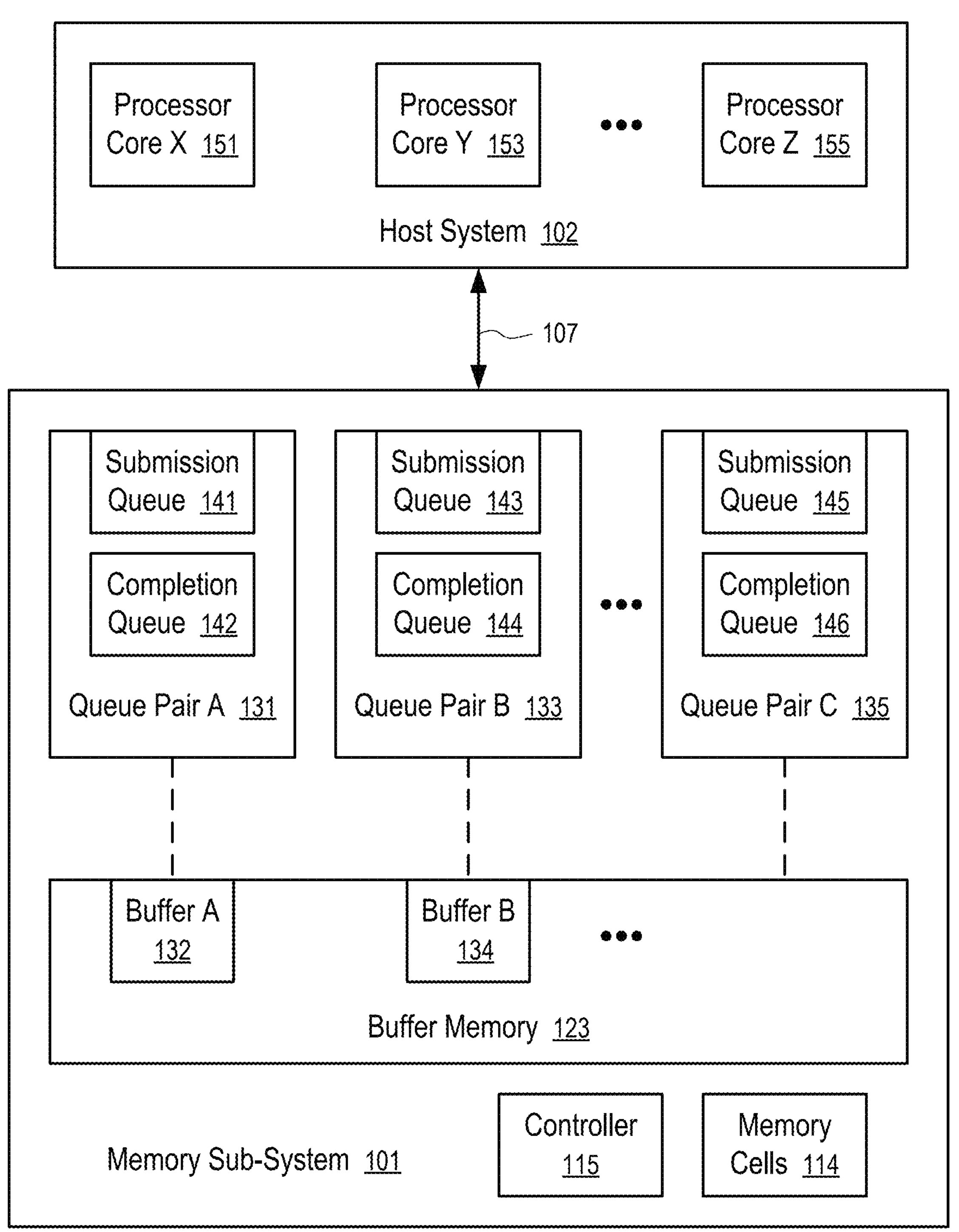
FIG. 3 and FIG. 4 show different configurations of buffers and queue pairs configured according to some embodiments.

In some implementations, the random access memory 121 of FIG. 2 is configured in the memory sub-system 101; and the processor cores 151, 153, . . . , 155 of the host system 102 are configured to access the queue pairs 131, 133, . . . , 135 over a connection (e.g., a computer bus 107, such as a PCIe bus) between the host system 102 and the memory sub-system 101, as illustrated in FIG. 3.

Figure 4:
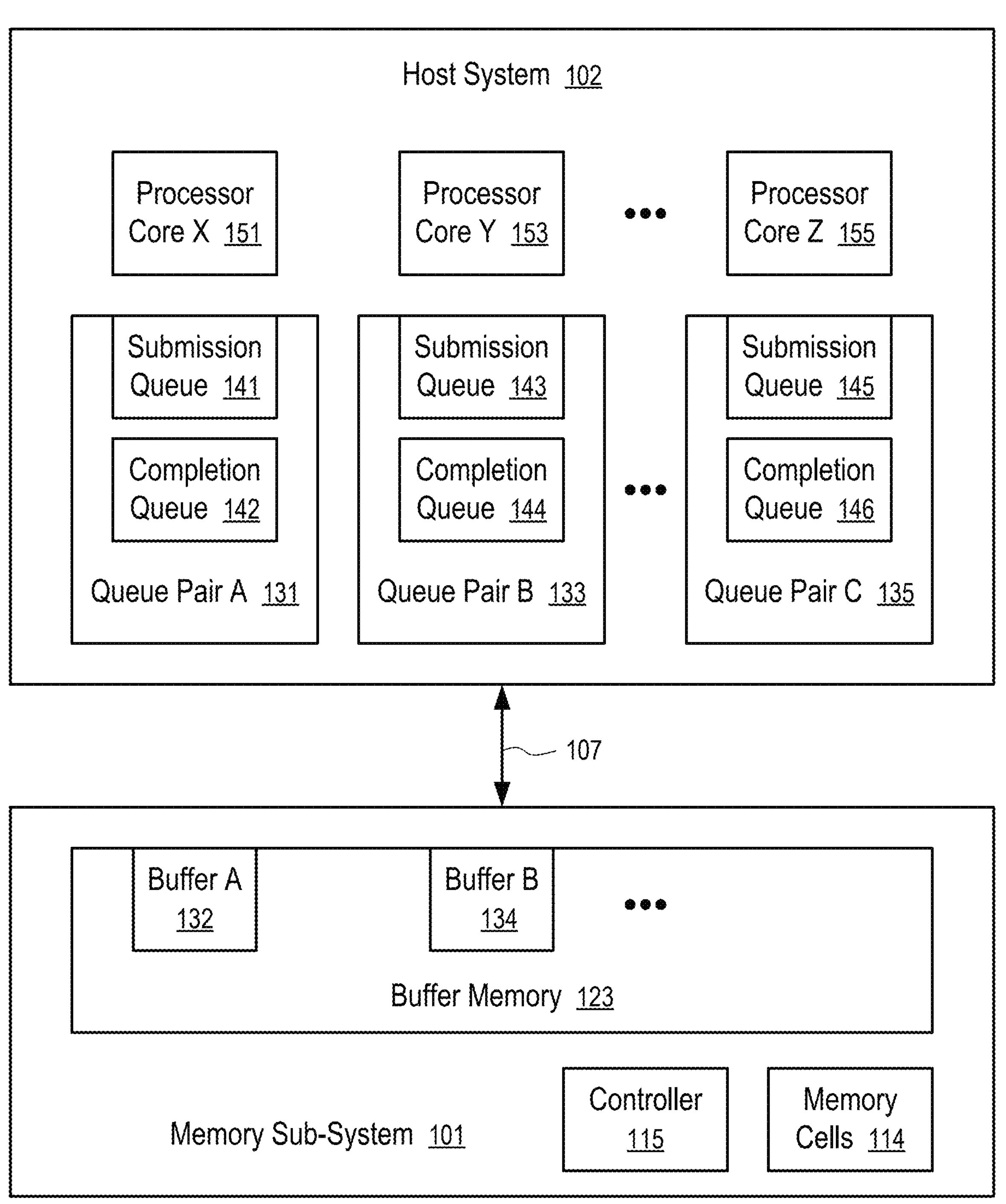

FIG. 3 and FIG. 4 show different configurations of buffers and queue pairs configured according to some embodiments. For example, the queue pairs 131, 133, . . . , 135 and the buffer memory 123 discussed in connection with the random access memory 121 of FIG. 2 can be configured in different ways as illustrated in FIG. 3 and FIG. 4.

In some implementations, the random access memory 121 of FIG. 2 can have a portion configured in the memory sub-system 101 to provide the buffer memory 123 and another portion configured in the host system 102 to host the queue pairs 131, 133, . . . , 135, as illustrated in FIG. 4. The buffer manager 113 in the controller 115 of the memory sub-system 101 is configured to access the queue pairs 131, 133, . . . , 135 over a connection (e.g., a computer bus 107, such as a PCIe bus) between the host system 102 and the memory sub-system 101.

Figure 5:
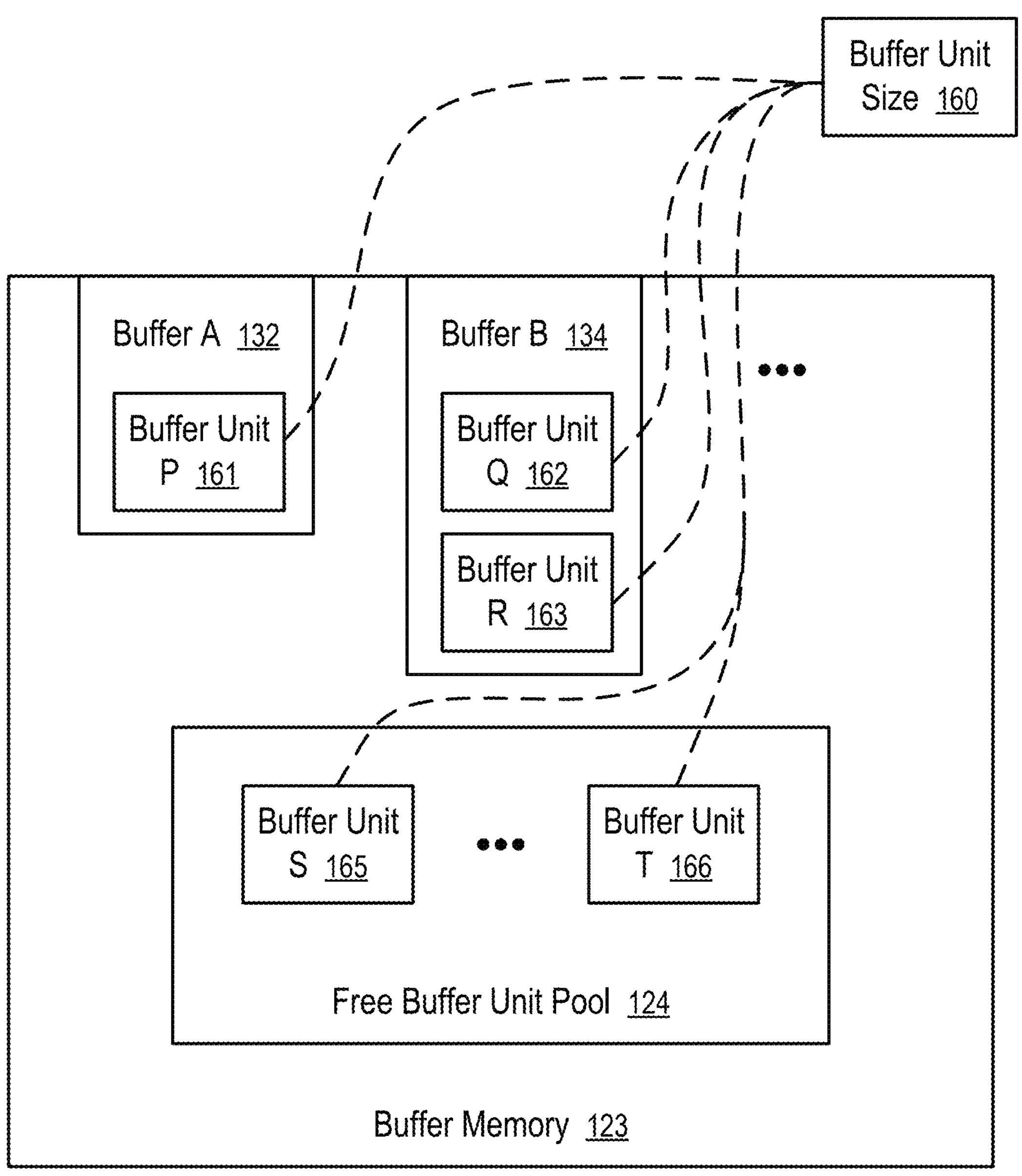
FIG. 5 shows a technique to construct buffers from buffer units of a predetermined size according to one embodiment.

FIG. 5 shows a technique to construct buffers from buffer units of a predetermined size according to one embodiment. For example, the buffers (e.g., 132, 134) allocated to respective submission queues (e.g., 141, 143) in FIG. 2 to FIG. 4 can be implemented using the technique of FIG. 5.

In FIG. 5, the buffer memory 123 is partitioned into a plurality of buffer units (e.g., 161, 162, 163, 165, . . . , 166). Each of the buffer units (e.g., 161) has a same predetermined size 160 (e.g., 0.5 MB).

The buffer manager 113 can store data identifying a pool 124 of free buffer units (e.g., 165, . . . , 166) that are available for allocation to any of the buffers (e.g., 132, or 134) associated with respective submission queues (e.g., 141, or 143).

Each buffer (e.g., 132, or 134) can have one or more buffer units. When more than one buffer unit (e.g., 162, 163) is allocated to a buffer (e.g., 134), the memory in the buffer units (e.g., 162, 163) are concatenated to form a buffer memory space to simplify memory management.

When a buffer (e.g., 134) is deallocated for its submission queue (e.g., 143), its buffer unit(s) (e.g., 162 and 163) can return to the free buffer unit pool 124 for reallocation.

When a buffer (e.g., 132) is to be enlarged (e.g., to accommodate a larger data access size requested via a read command in a submission queue (e.g., 141)), one or more buffer units can be allocated from the free buffer unit pool 124 and added to the buffer (e.g., 132) to increase its capacity through concatenation.

When a buffer (e.g., 134) is to be reduced (e.g., to accommodate a smaller data access size requested via a read command in a submission queue (e.g., 141)), one or more buffer units (e.g., 163) can be removed from the buffer (e.g., 134) and returned to the free buffer unit pool 124.

Figure 6:
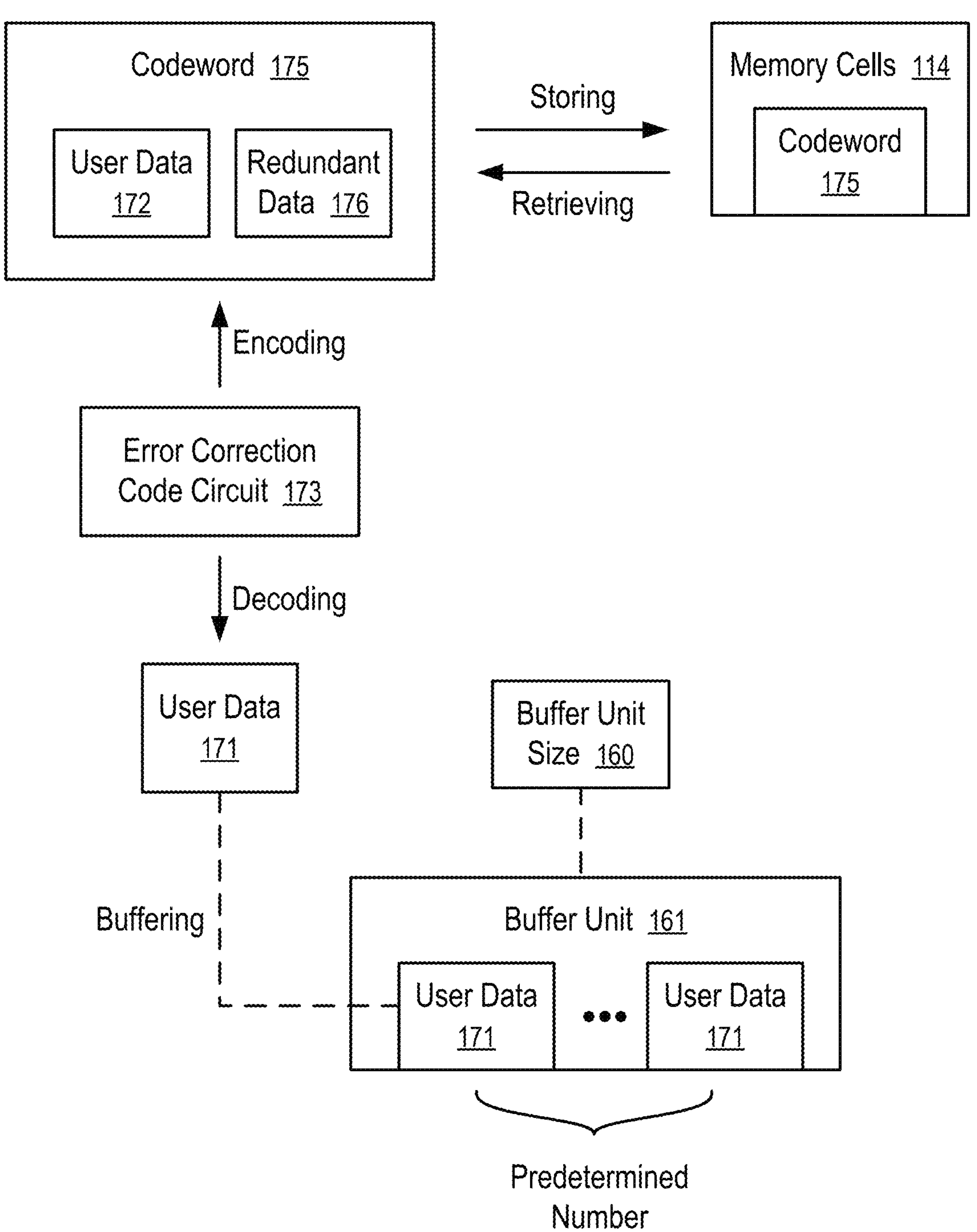
FIG. 6 shows a technique to size a buffer unit based on an error correction technique according to one embodiment.

Optionally, the buffer unit size 160 is configured based on a data size in an error correction technique used in the memory sub-system 101 to detect and correct random bit errors in data retrieved from the storage medium (e.g., NAND memory cells 114), as in FIG. 6.

FIG. 6 shows a technique to size a buffer unit based on an error correction technique according to one embodiment.

In FIG. 6, data stored in the memory cells 114 (e.g., NAND memory cells) as a persistent data storage medium of the memory sub-system 101 is protected using an error correct technique. For example, the error correct technique can be implemented in an error correction code circuit 173 configured in the memory sub-system 101.

To store user data 171, the error correction code circuit 173 performs an encoding operation to generate a codeword 175. The codeword 175 can include a copy of the user data 171 (e.g., as user data 172) and redundant data 176 generated from the user data 171 using the error correction code technique (e.g., a low-density parity-check (LDPC) code). The states of memory cells 114 can be programmed to represent the codeword 175 stored in the memory cells 114.

During the retrieval of the codeword 175 from the memory cells 114, the memory sub-system 101 can examine the states of the memory cells 114 to determine the codeword 175 as determined from the memory cells 114. In some instances, some random bits of the retrieved codeword 175 can have erroneous results. For example, the bit values in one or more random bits in the codeword 175 (e.g., in the portion representative of the user data 172 and/or the portion representative of the redundant data 176) may be flipped and thus erroneous. When the number of erroneous bits is small, the error correction code circuit 173 can perform a decoding operation to recover the error free version of the user data 171.

In FIG. 6, the size of the codeword 175 is a minimal size for the error correction code circuit 173 to perform the encoding/decoding operations using an error correction code technique. In some implementations, the user data 171 corresponding to the codeword 175 is an unit of data in a storage capacity of the memory sub-system 101 represented by one LBA address. The error correction code circuit 173 is configured to apply the error correction code to the entire unit of the user data 171 to be stored in the storage capacity represented by one LBA address as input to generate one codeword 175. Thus, the minimal size for decoding is to recover the user data 171 stored in the storage capacity represented by one LBA address; and the size of the user data 171 can be equal to the LBA data size (e.g., 512 byte or 4 KB).

In one embodiment, the buffer unit size 160 (e.g., 512 KB) is configured to be a multiple of the size of the user data 171 such that the buffer unit 161 can store user data (e.g., 171) decoded from a predetermined number of codewords (e.g., 175) retrieved from the memory cells 114. Preferably, the predetermined number is equal to $2^n$, where n is an integer. In one implementation, the buffer unit size 160 is configured to store a predetermined number (e.g., 4) of data chunks of a minimal size (e.g., 128 KB). In one implementation, the buffer unit size 160 is configured to store one data chunk of a minimal size (e.g., 128 KB).

In one embodiment, the buffer unit 161 is configured to have a capacity sufficient to store a predetermined number of data chunks (e.g., 4 data chunks). Each of the data chunks contains user data (e.g., 171) stores in storage capacity of a plurality of consecutive LBA addresses.

Preferably, each of the data chunk has a size that is equal to 2 m times the size of the user data (e.g., 171) of one codeword (e.g., 175), where m is an integer. Thus, the predetermined number of data chunks is $2^{n-m}$ chunks. Such a configuration can greatly simplify the operations to facilitate dynamic sizing and allocation of portions of the buffer memory 123 to individual buffers (e.g., 132, or 134) that are associated specifically with respective submission queues (e.g., 141, or 143).

Alternatively, the buffer unit 161 is configured to store one data chunk of a predetermined minimal size (e.g., 2 m KB, such as 128 KB).

Figure 7:
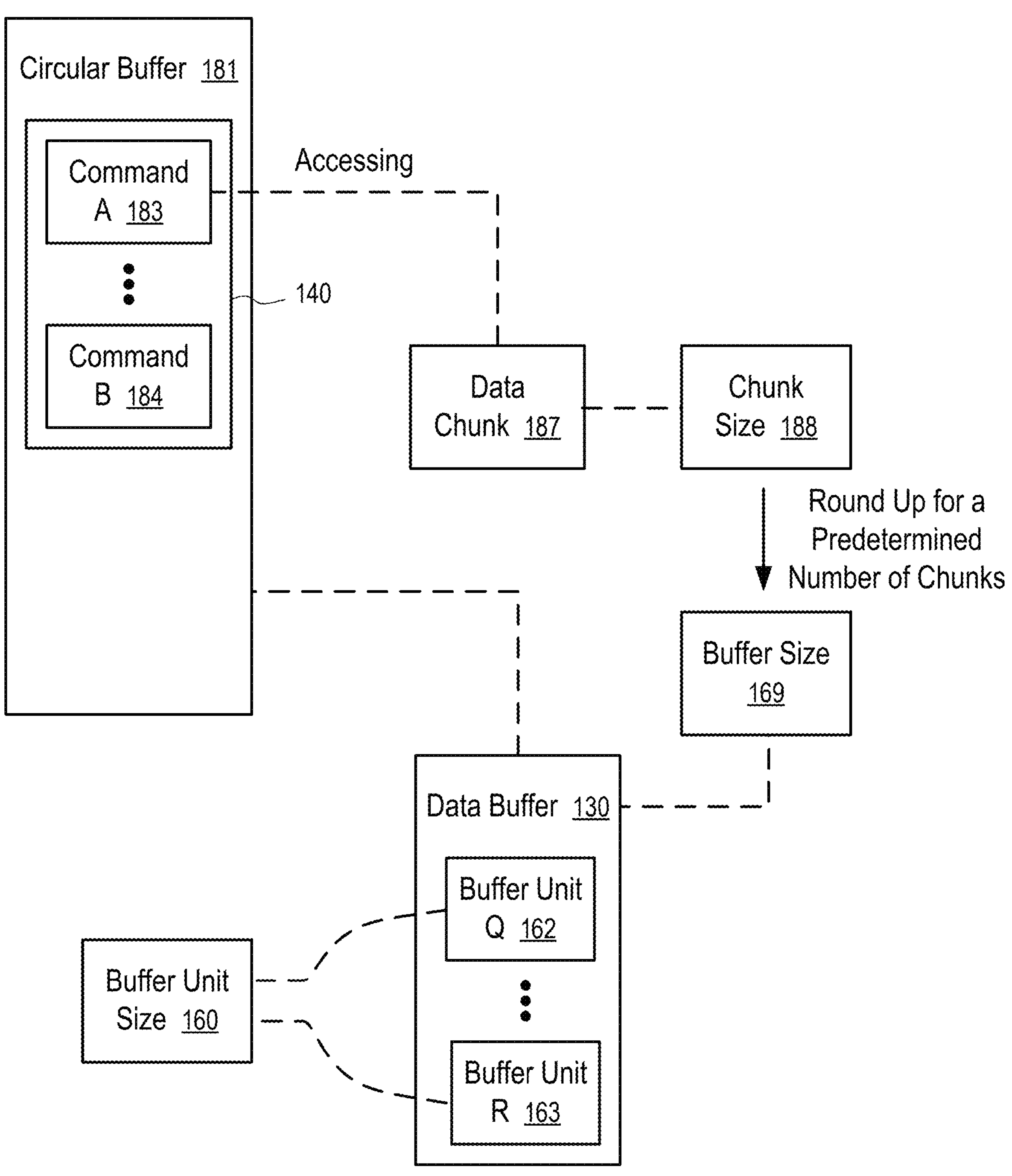
FIG. 7 shows a technique to allocate a buffer according to one embodiment.

FIG. 7 shows a technique to allocate a buffer according to one embodiment. For examples, allocation of the buffers (e.g., 132, 134) submission queues (e.g., 141, 143) respectively in FIG. 2 to FIG. 4 can be performed using the technique of FIG. 7 and buffer units sized according to FIG. 5 and/or FIG. 6.

In FIG. 7, a submission queue 140 is configured in a circular buffer 181 having a predetermined number of slots. Each of the slots is configured to hold a command from the host system 102 to the memory sub-system 101.

When the submission queue 140 receives an initial read command 183 to access a data chunk 187 according to an LBA address specified in the command 183, the buffer manager 113 can determine a chunk size 188 of the data chunk 187 requested via the command 183. For example, the read command 183 can request the retrieval of the data chunk 187 stored in a range of LBA addresses starting from the LBA address specified in the command 183. The buffer manager 113 is configured to determine the buffer size 169 that is a multiple of the buffer unit size 160 such that the data buffer 130 can hold the predetermined number (e.g., $2^{n-m}$, such as 4) of chunks.

Based on the buffer size 169, the buffer manager 113 can allocate a number of buffer units 162, . . . , 163 from the free buffer unit pool 124 such that the combined capacity of the buffer units 162, . . . , 163 provides the buffer 130 of the size that is sufficient to store the predetermined number (e.g., $2^{n-m}$, such as 4) of data chunks, each having the chunk size 188.

The buffer manager 113 is configured to store metadata for the data buffer 130. The metadata identifies the chunk size 188 and the starting memory addresses of the buffer units 162, . . . , 163 to provide a logically contiguous buffer memory that is implemented using the memory provided in the buffer units 162, . . . 163. The physical memory addresses of memory provided in the buffer units 162, . . . , 163 can be discontinuous across the buffer units 162, . . . , 163.

For example, the data buffer 130 can be used to store the predetermined number (e.g., $2^{n-m}$, such as 4) data chunks following in the data chunk 187 in the logical address space used by the command 183 to request the retrieval of the data chunk 187. The prefetching operations can be performed before the host system 102 enters the next command(s) (e.g., 184) into the submission queue 140 and/or before the commands (e.g., 184) are retrieved from the submission queue 140.

In some instances, the next commands (e.g., 184) can access the data chunks in the data buffer 130 out of order. As a result, the data chunks in the data buffer 130 can have discontinuous logical addresses in general. The metadata stored for the data buffer 130 can include the starting LBA address of each data chunk stored in the data buffer 130.

The buffer manager 113 is configured to continuously monitor the commands coming from the submission queue 140 to detect a change in chunk size (e.g., 188). A change in the chunk size 188 can cause a change in the buffer size 169; and in response, the buffer manager 113 can adjust the size of the data buffer 130 as in FIG. 8.

Figure 8:
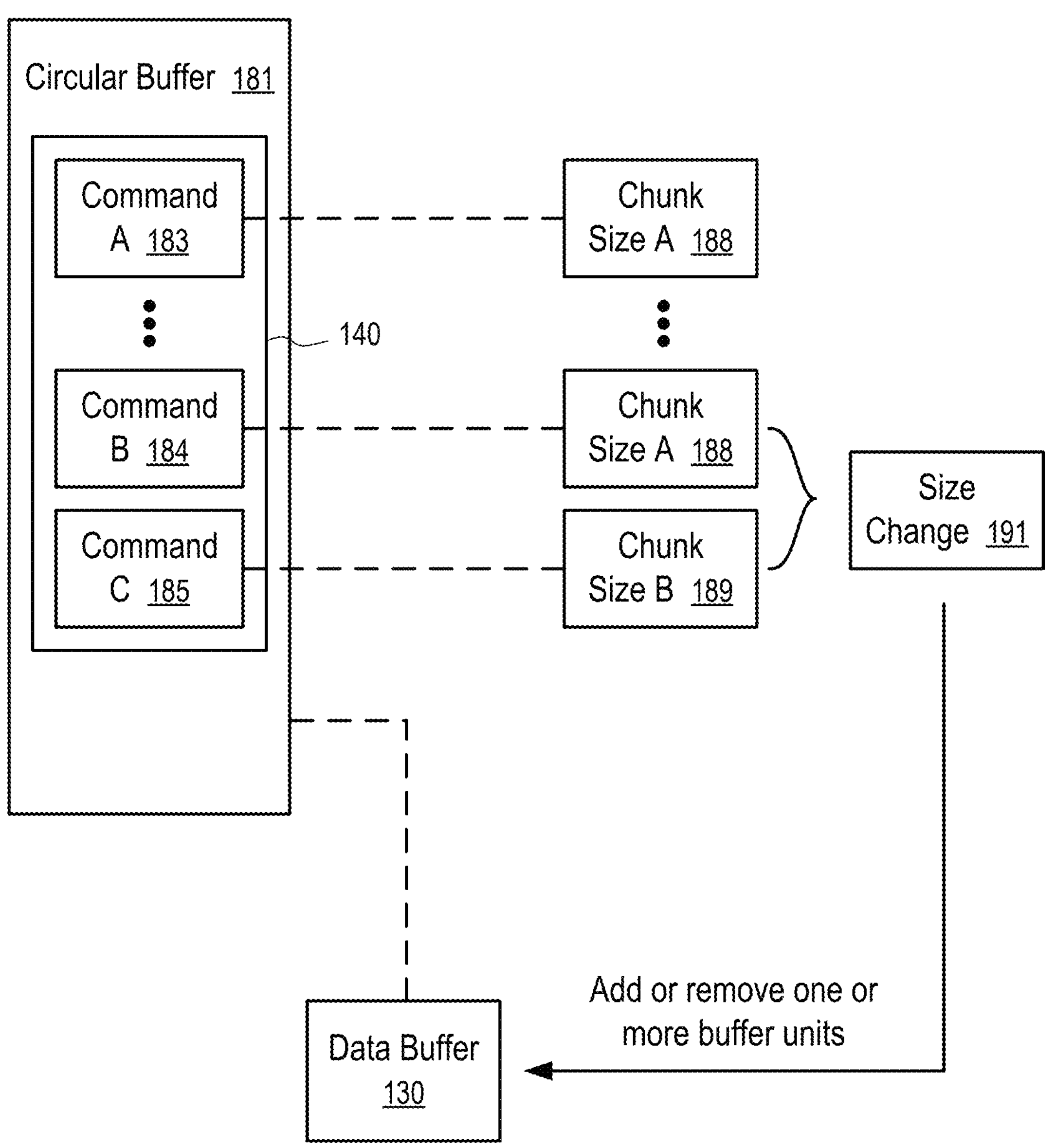
FIG. 8 shows a technique to adjust the size of a buffer according to one embodiment.

FIG. 8 shows a technique to adjust the size of a buffer according to one embodiment.

In FIG. 8, read commands 183, . . . , 184 are configured to request the retrieval of data chunks (e.g., 187) of a same chunk size 188. A subsequent command 185 is configured to request the retrieval of a data chunk that has a new chunk size 189 that is different from the prior chunk size 188. In response to the size change 191, the buffer manager 113 can determine a new buffer size 169 according to the new chunk size 189.

When the new buffer size 169 is smaller than the current buffer size, the buffer manager 113 can down size the buffer 130 by removing one or more buffer units from the data buffer 130 and update the metadata for the operations of the buffer 130.

When the new buffer size 169 is larger than the current buffer size, the buffer manager 113 can enlarge the buffer 130 by allocating one or more buffer units from the free buffer unit pool 124, and adding the one or more allocated buffer units to the data buffer 130. The buffer manager 113 can further update the metadata for the operations of the buffer 130.

As illustrated in FIG. 8, the chunk size and/or the buffer size of the data buffer 130 can change dynamically over time based on the commands received in the submission queue 140. In some instances, the change in the chunk size is small and thus does not change the buffer size; and in other instances, the change in the chunk size can be sufficiently large to cause a change in the buffer size.

FIG. 9 to FIG. 12 show examples of dynamic management of a buffer associated with a submission queue according to one embodiment. For example, the buffers (e.g., 132, 134) associated specifically with respective submission queues (e.g., 141, 143) in FIG. 2 to FIG. 4 can be managed as in FIG. 9 to FIG. 12. For example, the submission queue 140 in FIG. 9 to FIG. 12 can be an example of a submission queue (e.g., 141 or 143) in FIG. 2 to FIG. 4.

Figure 9:
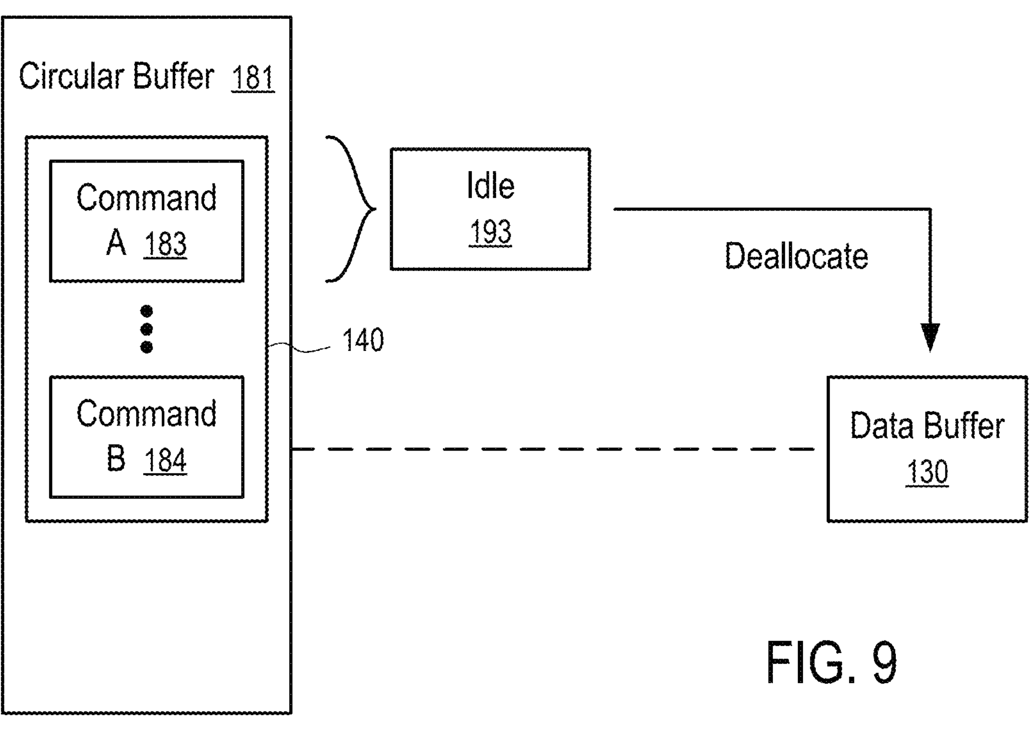
FIG. 9 to FIG. 12 show examples of dynamic management of a buffer associated with a submission queue according to one embodiment.
Figure 10:
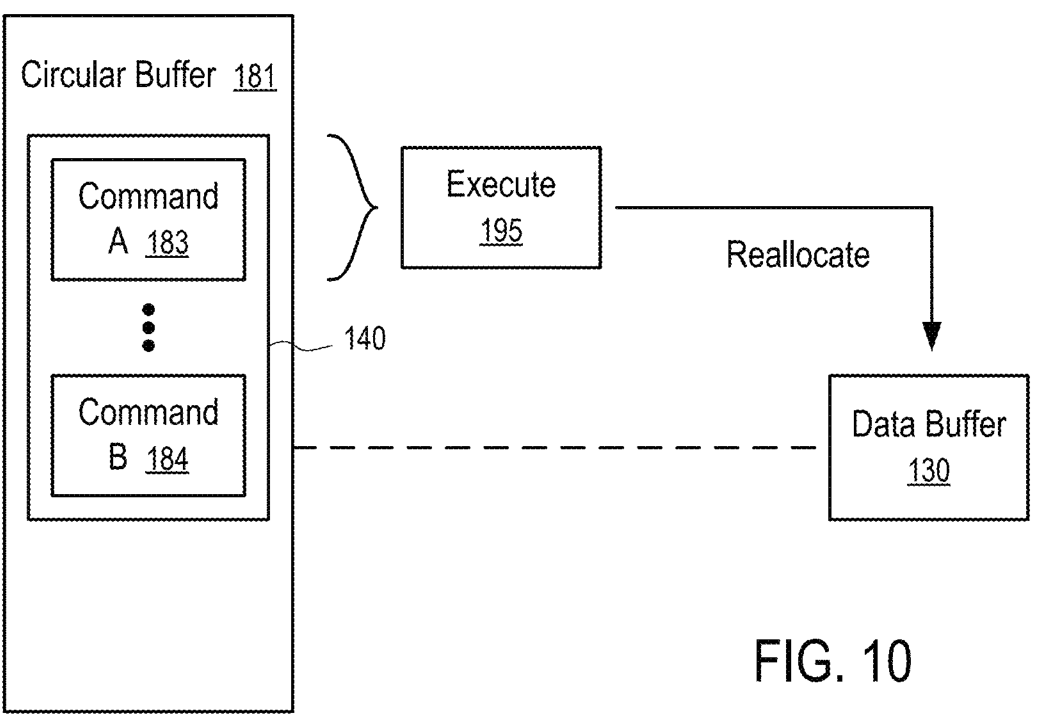

FIG. 9 shows an example to dynamically deallocate a buffer 130 associated with the submission queue 140 after the submission queue 140 idles 193 for a period of time longer than a threshold.

In one implementation, the queue 140 is determined to be idling when the queue 140 has no pending commands in the circular buffer 181.

In another implementation, the queue 140 is determined to be idling when no commands are retrieved from the queue 140 in the circular buffer 181 for execution.

In a further implementation, the queue 140 is determined to be idling when execution of commands from the queue 140 is suspended.

When the submission queue 140 is idling for a period of time longer than the threshold, the data buffer 130 allocated to the submission queue 140 can be deallocated so that the random access memory of the buffer 130 can be reallocated to an active submission queue (e.g., 145) for improved system performance.

After the submission queue 140 idles for the period of time longer than a threshold, the submission queue 140 can become active again for command execution. When the memory sub-system 101 executes 195 a command 183 in the submission queue 140, as in FIG. 10, the buffer manager 113 can determine that subsequent commands (e.g., 184) have sequential accesses; and in response, the buffer manager 113 can reallocate the buffer 130 for buffering the data chunks addressed by the subsequent commands (e.g., 184) or expected to be addressed by commands to be added to the submission queue 140.

In some implementations, the buffer 130 is used to buffer data requested by the commands in the queue 140; and the fetching of the data to the buffer 130 is according to the data requests in the read commands (e.g., 184) in the submission queue 140 and thus is not speculative. After the execution of the last command 184 in the submission queue 140, the buffer manager 113 can determine if the prior accesses in the queue 140 are sequential; and if so, the buffer manager 113 can start speculative prefetching for the submission queue 140 in anticipation that one or more subsequent commands to be added to the queue 140 after the command 184 will also be likely for sequential addresses.

Figure 11:
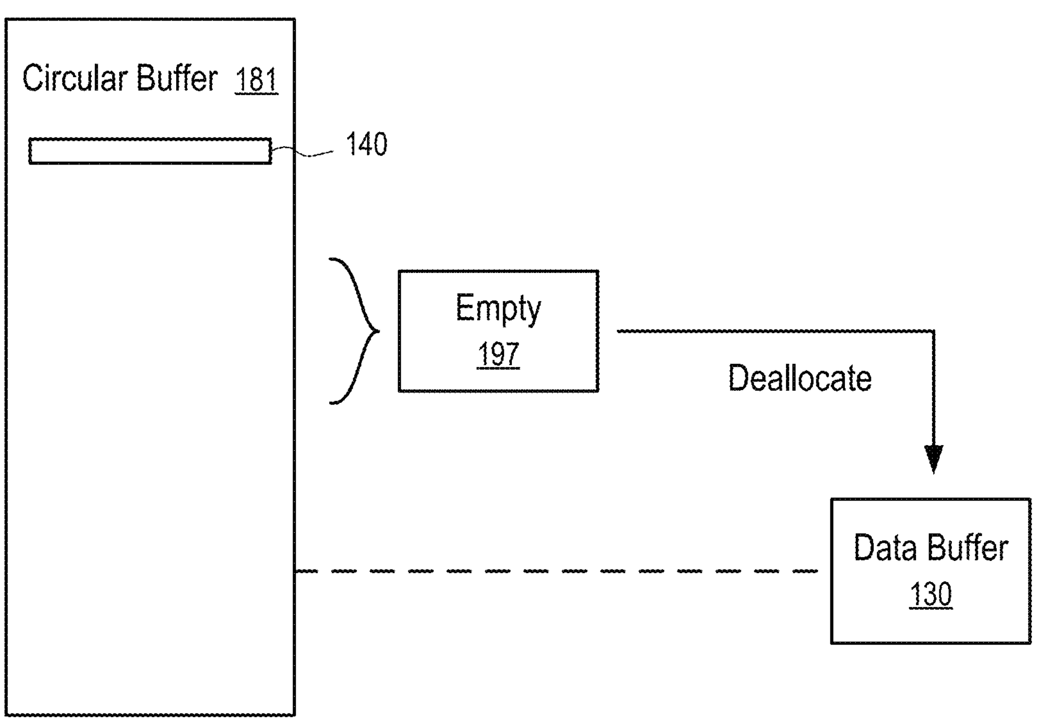

After the execution of the pending commands (e.g., 183, . . . , 184) in the submission queue 140, the circular buffer 181 can become empty 197 (and in a state of idling 193), as in FIG. 11. If the submission queue 140 is empty 197 for a period of time longer than a threshold, the buffer manager 113 can assume that the thread previously using the submission queue 140 is suspended or has completed. In response, the buffer manager 113 can deallocate the data buffer 130 from the submission queue 140 in anticipation of a different thread starting to use the submission queue 140.

Figure 12:
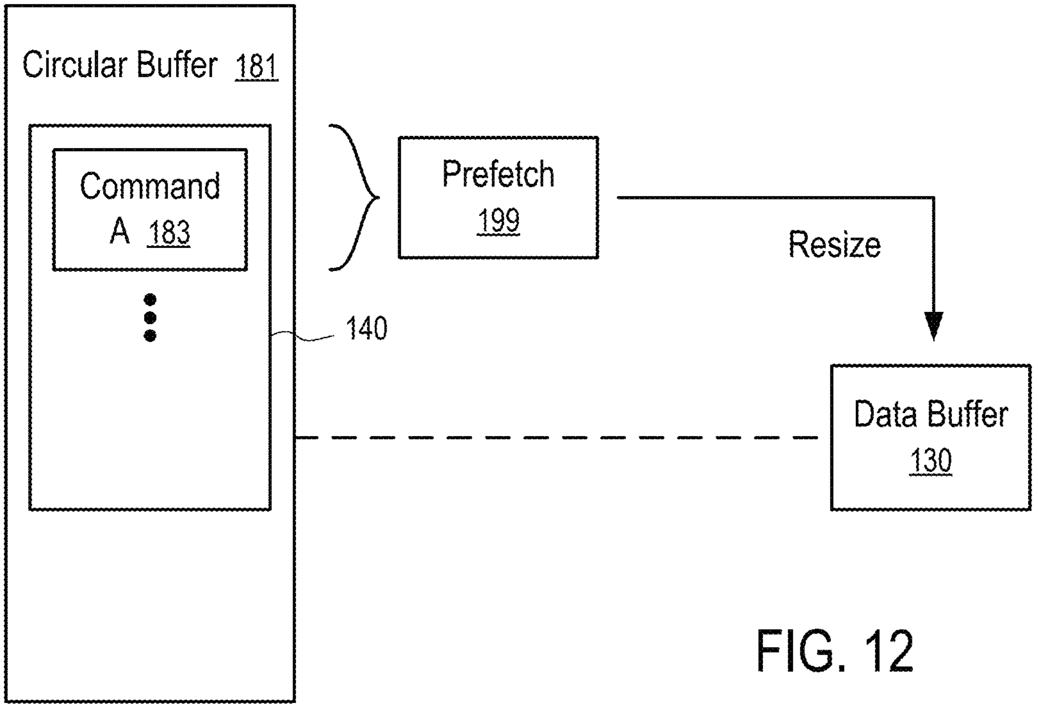

After the submission queue 140 is empty 197 for a period of time longer than the threshold, the submission queue 140 can receive a command 183 from the host system 102, as in FIG. 12. Such a command 183 can be considered an initial access from a separate thread (e.g., started in the respective processor core, or switch to the respective processor core from another processor core). The buffer manager 113 can assume that subsequent access from the thread is sequential, allocate a data buffer 130 for the submission queue 140, and turn on the prefetching mode for the submission queue 140.

In some instances, the submission queue 140 is already in the prefetching mode (e.g., based on one more last executed commands previously in the submission queue 140). When the command 183 enters the submission queue 140 as the only pending command in the submission queue 140, the command 183 can request a data chunk having a different size. In response, the memory sub-system 101 can restart the operation to prefetch 199. For example, if the access address of the command 183 is non-sequential from the prior command(s) previously in the submission queue, the data chunks prefetched in view of the prior command(s) can be discarded; and new data chunks can be prefetched based on the address specified in the command 183. Further, the new access size of the command 183 can cause a change in the size of the buffer 130 in order to buffer the predetermined number of data chunks. The memory sub-system can resize the buffer 130 by adding or removing one or more buffer units, as in FIG. 8.

Figure 13:
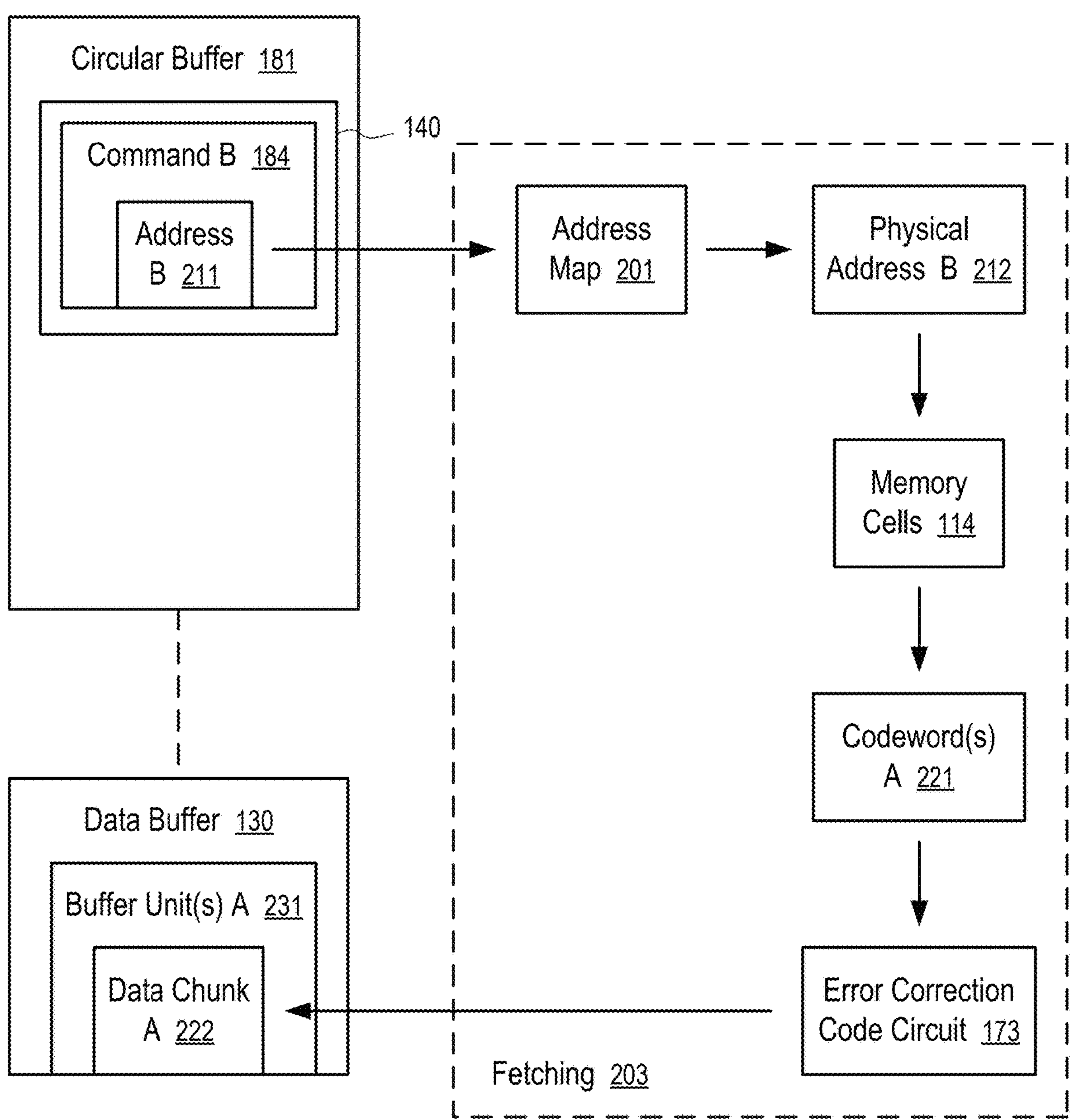
FIG. 13 to FIG. 15 show examples of prefetching implemented according to one embodiment.
Figure 14:
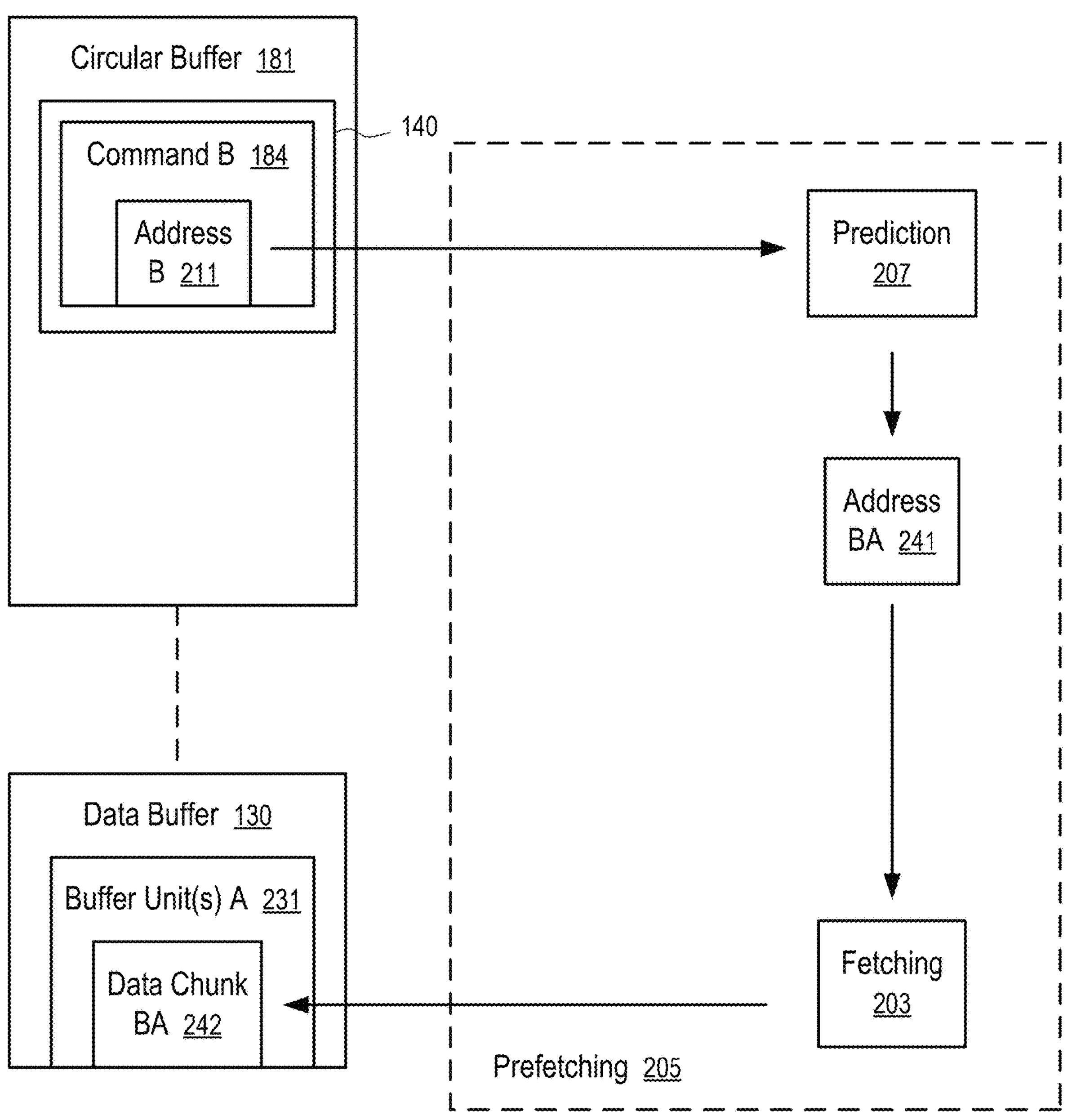
Figure 15:
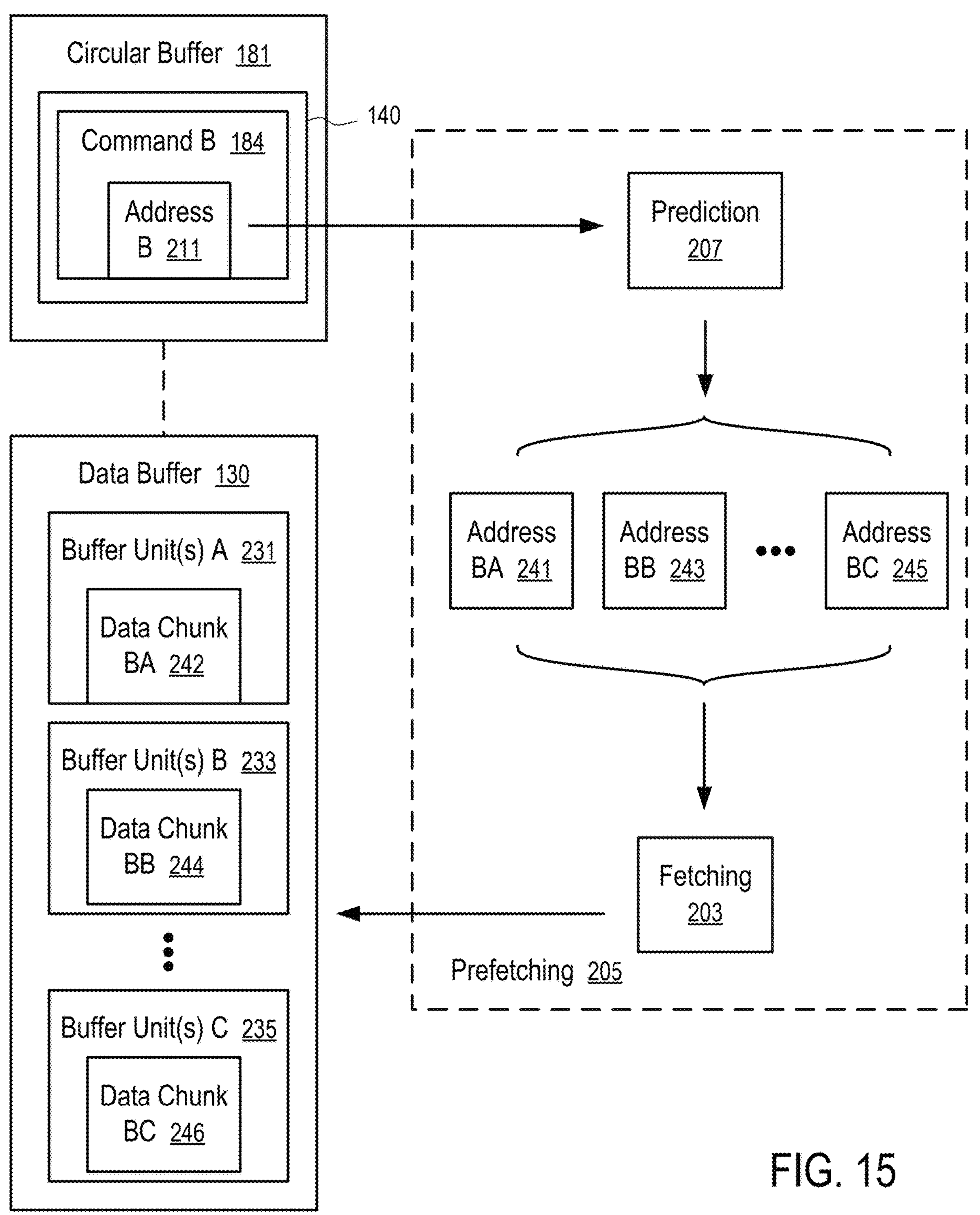

FIG. 13 to FIG. 15 show examples of prefetching implemented according to one embodiment. For example, prefetching discussed above in connection with FIG. 1 to FIG. 12 can be implemented in a way as in FIG. 13 to FIG. 15.

In FIG. 13, a command 184 in the submission queue 140 identifies an address 211 of a data chunk 222 to be retrieved from the memory sub-system 101.

For example, the address 211 can include a starting LBA address and a range of LBA addresses following the starting LBA address that store the data chunk 222.

The memory sub-system 101 maintains an address map 201 that can be used to map the LBA addresses used in the commands (e.g., 184) to physical addresses (e.g., 212) to retrieve data from memory cells 114 that are configured as a persistent storage medium in the memory sub-system 101. The memory sub-system 101 can examine the states of the memory cells 114 identified by the physical address(es) 212 to determine codeword(s) 221 stored in the memory cells 114. The error correction code circuit 173 of the memory sub-system 101 can decode the codeword(s) 221 to obtain the data chunk 222 and store the data chunk 222 temporarily in the buffer 130 implemented using one or more buffer units 231.

During the execution of the command 184, the memory sub-system 101 can determine that the data chunk 222 identified by the address 211 is available in the buffer 130. Then, the memory sub-system 101 can transmit the data chunk 222 from the buffer 130 to a destination identified by the command 184.

In FIG. 13, the memory sub-system 101 performs the operations of fetching 203 based on the address 211 specified in a command 184 in the submission queue 140, where the data chunk 222 is addressed by the address 211. Optionally, the data chunk 222 is fetched 203 into the buffer 130 that is specifically for the submission queue 140. Alternatively, the data chunk 222 is fetched into a portion of the buffer memory 123 that is reserved for buffering data for commands currently in process of being executed. Such a buffer is not specifically associated with a particular submission queue.

FIG. 14 illustrates an example of speculative prefetching 205. In FIG. 14, based on the address 211 specified in the command 184, the memory sub-system performs a prediction 207 to identify an address 241 that is likely to be accessed in a command that will be added to the submission queue 140. The address 241 is determined by the memory sub-system 101 before it is specified by the host system 102 using a command in the submission queue 140. Using the predicted address 241, the memory sub-system 101 can perform fetching 203, in a way similar to that illustrated in FIG. 13, to store the data chunk 242 addressed by the predicted address 241 into the buffer 130 that is specifically associated with the submission queue 140.

FIG. 15 illustrates an example of speculative prefetching 205 a predetermined number of data chunks (e.g., $2^{n-m}$, such as 4 data chunks). Based on the address 211 specified in a command 184 in the submission queue 140, the memory sub-system 101 performs a prediction 207 to identify the predetermined number of addresses 241, 243, . . . , 245 in anticipation that one or more of the addresses 241, 243, . . . , 245 will be accessed by commands to be added to the submission queue 140. Thus, the addresses 241, 243, . . . , 245 are not yet specified by any of the commands in the submission queue 140. The memory sub-system 101 can perform fetching 203 (e.g., in a way as illustrated in FIG. 13) of data chunks 24, 244, . . . , 246 respectively from the predicted addresses 241, 243, . . . , 245.

When one or more subsequent commands added to the submission queue 140 actually specifies any of the addresses 241, 243, . . . , 245, the memory sub-system 101 can execute the commands using the data chunks in the data buffer 130 associated specifically to the submission queue 140 and perform a further prediction 207 to prefetch 205 further data chunks into the data buffer 130 implemented using buffer units 231, 233, . . . , 235 via concatenation.

When one or more subsequent commands in the submission queue 140 do not specify an of the addresses 241, 243, . . . , 245, the prediction 207 can be considered in effective; and the memory sub-system 101 can stop the prefetching mode for the submission queue 140. The buffer manager 113 can then deallocate the buffer 130 from the submission queue 140.

FIG. 16 to FIG. 19 show methods to manage buffers for submission queues according to one embodiment. The methods of FIG. 16 to FIG. 19 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the methods of FIG. 12 to FIG. 15 are performed at least in part by the processing device 118 of the host system 102, the controller 115 of the memory sub-system 101, and/or the local media controller 105 of the memory sub-system 101 in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the methods of FIG. 16 to FIG. 19 can be implemented via buffer managers 113 in the computing system 100 of FIG. 1 to manage buffers (e.g., 130, 132, or 134) that are specifically allocated to and associated with submission queues (e.g., 140, 141, or 143) as in FIG. 2 to FIG. 15.

Figure 16:
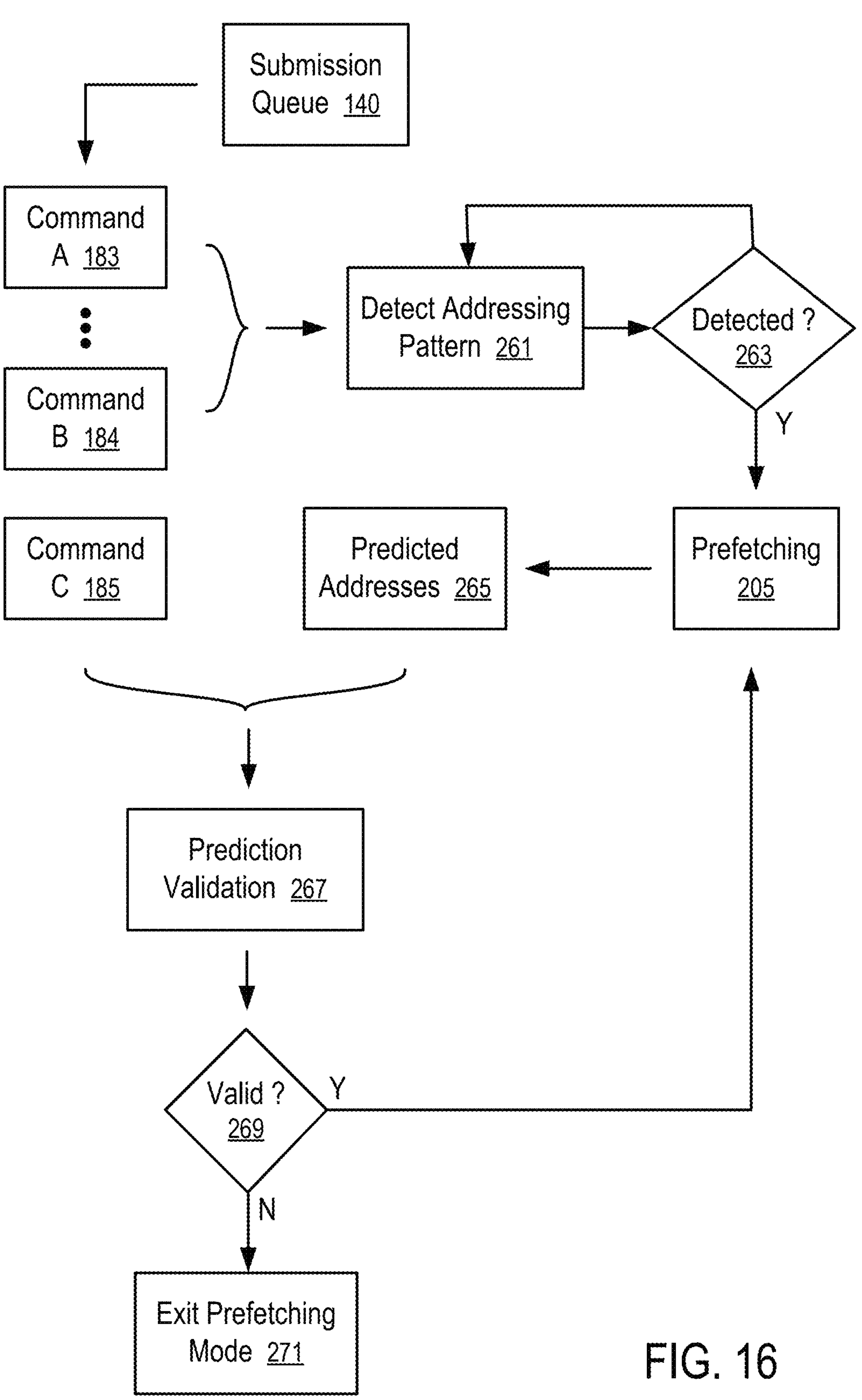

In FIG. 16, a submission queue 140 in a memory sub-system (e.g., 101) is configured to receive a sequence of commands 183, . . . , 184, 185 from a host system (e.g., 102) in FIG. 1.

From one or more commands (e.g., 183, . . . , 184) in the submission queue 140, the buffer manager 113 in the memory sub-system 101 can determine or detect 261 whether the commands in the submission queue 140 have an addressing pattern.

At block 263, if the buffer manager 113 detects or determines that there is an addressing pattern, the buffer manager 113 can cause the memory sub-system 101 to perform prefetching 205 (e.g., as in FIG. 14 and FIG. 15).

During prefetching 205, the memory sub-system 101 can predict one or more addresses 265 (e.g., 241, 243, . . . , 245) that are expected to be addressed in a command 185 in the submission queue 140. When the command 185 is retrieved from the submission queue 140, the memory sub-system 101 can determine, in prediction validation 267, whether there is a match between the address specified in the command 185 and the predicted addresses 265. If the predicted addresses 265 contains the address specified in the command 185, the prediction 207 performed in the prefetching 205 is valid. The memory sub-system 101 can continue prefetching 205.

If, at block 269, the memory sub-system 101 determines that the prediction 207 is invalid, the memory sub-system 101 can exit the prefetching mode 271. In response, the buffer manager 113 can deallocate the buffer 130 that is specifically associated with the submission queue 140.

In some embodiments, a memory sub-system 101 is configured to allocate buffers (e.g., 132 or 134) specifically to respective submission queues (e.g., 141 or 143) or queue pairs (e.g., 131 or 133). A submission queue (e.g., 141) or queue pair (e.g., 131) can have its dedicated buffer (e.g., 132)

For example, the memory sub-system 101 can have: a random access memory 121 containing a first type of memory cells (e.g., volatile memory, such as dynamic random access memory (DRAM)); a storage medium containing a second type of memory cells 114 (e.g., non-volatile memory, such as NAND memory) different from and slower than the first type; and at least one processing device 117 configured via instructions (e.g., firmware) to perform operations of the buffer manager 113 discussed above, such as a method in FIG. 17 to allocate buffers (e.g., 132, 134) specifically for individual submission queues (e.g., 141, 143).

At block 301, the method of FIG. 17 includes configuring a plurality of submission queues 141, 143, . . . , 145 accessible to both the memory sub-system 101 and the host system 102.

For example, the memory sub-system 101 and the host system 102 can communicate with each other during a boot time to establish the submission queues 141, 143, . . . , 145 in a memory of the host system 102 (e.g., in FIG. 4), or in a memory of the memory sub-system 101, such that the submission queues 141, 143, . . . , 145 can be accessed by both the memory sub-system 101 and the host system 102. The host system 102 can communicate, via the submission queues 141, 143, . . . , 145, to the memory sub-system 101 commands (e.g., 183, 184, 185) to access the storage medium of the memory sub-system 101.

At block 303, the method includes configuring, in a random access memory (e.g., local memory 119) of the memory sub-system 101, one or more buffers (e.g., 132, 134, or 130).

At block 305, the method includes associating the one or more buffers (e.g., 132, 134, or 130) respectively with one or more submission queues (e.g., 141, 143, or 140) among the plurality of submission queues.

At block 307, the method includes loading data (e.g., data chunk 222, or 242) from the storage medium (e.g., memory cells 114) of the memory sub-system 101 to a first buffer (e.g., 130) among the one or more buffers (e.g., 132, 134, . . . , 130).

At block 309, the method includes retrieving, from a first submission queue (e.g., 140) associated with the first buffer (e.g., 130) among the plurality of the submission queues, a first command (e.g., 184) configured to access the storage medium (e.g., memory cells 114 at a range of logical addresses specified by first command 184).

At block 311, the method includes executing the first command (e.g., 184) using the data in the first buffer (e.g., 130).

For example, the method can further include: retrieving a second command (e.g., 183) from the first submission queue (e.g., 140). Based on the second command (e.g., 183), the first buffer (e.g., 130) is allocated specifically for association with the first submission queue (e.g., 140) among the plurality of submission queues (e.g., 141, 143, . . . , 145).

For example, the method can further include: determining a size (e.g., 188) of a data chunk (e.g., 187) addressed for access by the second command (e.g., 183); and determining a size (e.g., 169) of the first buffer (e.g., 130) based on the size (e.g., 188) of the data chunk (e.g., 187) addressed by the second command (e.g., 183) retrieved from the first submission queue (e.g., 140).

For example, the size (e.g., 169) of the first buffer (e.g., 130) is a multiple of a predetermined size (e.g., 160) of buffer units (e.g., 161, 162, 163, 165, or 166); and the first buffer (e.g., 130) is implemented via concatenation of first buffer units (e.g., 162, . . . 163) each having the predetermined size (e.g., 160).

For example, the method can further include: storing for the operations of the first buffer 130 metadata identifying: the size (e.g., 188) of the data chunk (e.g., 187); and physical memory addresses of memories of the first buffer units (e.g., 162, . . . , 163). The memories of the first buffer units (e.g., 162, . . . , 163) can be discontinuous in the random access memory (e.g., local memory 119). The predetermined size (e.g., 160) of buffer units (e.g., 162, or 163) is a multiple of a size of data (e.g., 171) decodable from a codeword (e.g., 175) by an error correction code circuit 173 of the memory sub-system 101. Further, the predetermined size (e.g., 160) of buffer units (e.g., 162 or 163) is also a multiple of a size of a storage capacity represented by one logical block addressing (LBA) address specified in the second command (e.g., 183) (e.g., LBA data size). The data chunk 187 can be the data addressed by a range of LBA addresses identified by the second command (e.g., 183).

For example, the metadata is further configured to identify logical block addressing (LBA) addresses of data in the first buffer units (e.g., 162, . . . , 163).

For example, the random access memory 121 containing the buffer memory 123 can be a dynamic random access memory (DRAM); and the storage medium (e.g., memory cells 114) can be a NAND memory.

For example, the first buffer (e.g., 130) is sized to have a capacity to store a predetermined number of data chunks (e.g., 4 data chunks), each having the size (e.g., 188) of the data chunk (e.g., 187). As sizes of data chunks requested via the commands (e.g., 184, 185) change, the size of the first buffer (e.g., 130) can change via addition or removal of one or more buffer units of the predetermined buffer unit size 160, as in the method of FIG. 18.

For example, the predetermined buffer unit size can be 512 KB; and a storage capacity represented by the logical block addressing (LBA) address can be 4 KB. For example, the size of user data (e.g., 171) decodable from a codeword (e.g., 175) by an error correction code circuit 173 of the memory sub-system 101 can also be 4 KB.

Figure 18:
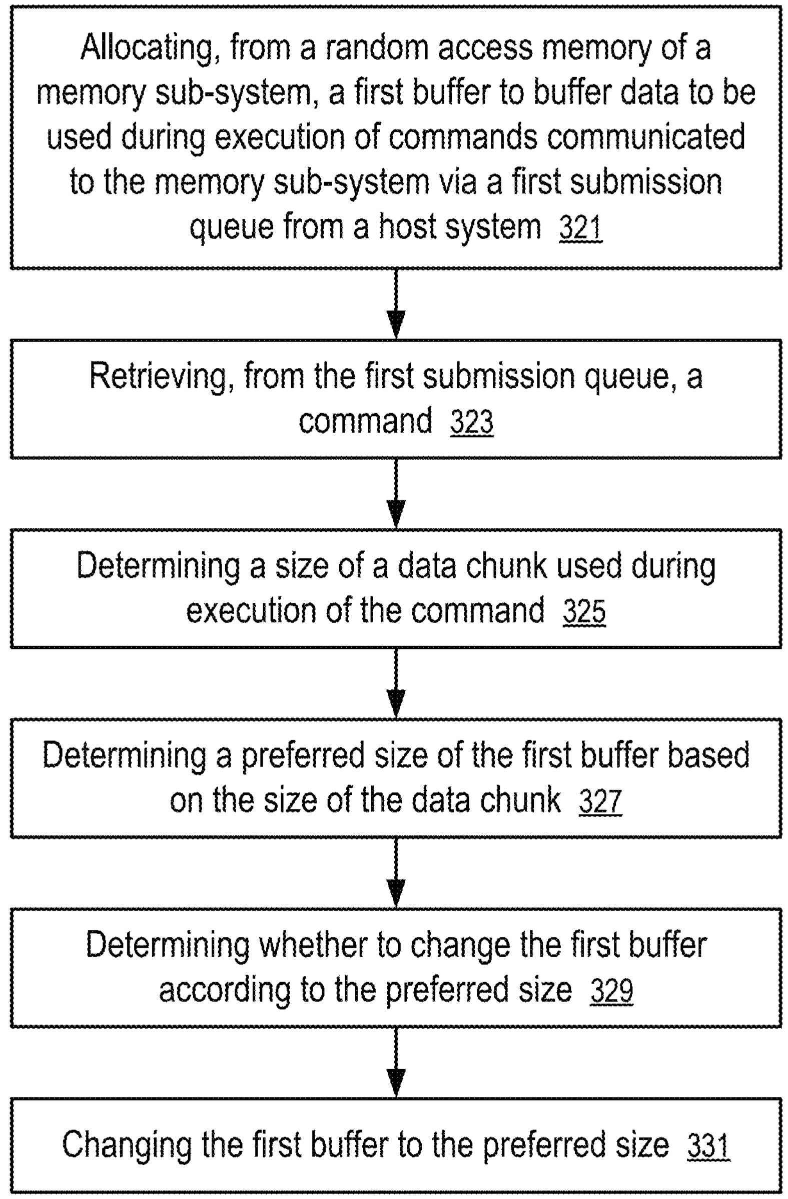

At block 321, the method of FIG. 18 includes allocating, from a random access memory 121 or buffer memory 123 of a memory sub-system 101, a first buffer (e.g., 130) to buffer data to be used during execution of commands communicated to the memory sub-system 101 via a first submission queue (e.g., 140) from a host system 102.

For example, the memory sub-system 101 can partition the buffer memory 123 into interchangeable buffer units (e.g., 161, 162, 163, 165, . . . , 166) of a same predetermined size 160. The first buffer 130 can be implemented using one or more of the buffer units (e.g., 161, 162, 163, 165, . . . , 166). When more than one buffer unit is used to implement the first buffer 130, buffer concatenation can be used to combine the memory of the buffer units of the first buffer 130 to form the capacity of the first buffer 130.

For example, a first subset of the buffer units (e.g., 161, 162, 163, 165, . . . 166) can be used to implement the first buffer 130.

At block 323, the method includes retrieving, from the first submission queue 140, a command (e.g., 185). For example, the command (e.g., 185) is received from the first submission queue 140 when the first buffer 130 is implemented using the first subset of the buffer units (e.g., 161, 162, 163, 165, . . . , 166).

At block 325, the method includes determining a size (e.g., 189) of a data chunk used during execution of the command (e.g., 185).

For example, the command (e.g., 185) can be a read command configured to identify a starting LBA address and a range of LBA addresses to request the retrieval of the data stored in the range of LAB addresses, including the starting LBA addresses. The data stored in the range of LAB addresses is the data chunk requested by the read command. In some instances, the data chunk is pre-loaded entirely or partially into the buffer before the retrieval of the command (e.g., 185). In other instances, the data chunk has no apparent relations with previous data chunks requested via the submission queue (e.g., 140); and thus, the data chunk is not present in the first buffer 130.

At block 327, the method includes determining a preferred size of the first buffer 130 based on the size of the data chunk addressed by the command (e.g., 185) retrieved from the first submission queue (e.g., 140).

For example, the preferred size of the first buffer 130 can be determined in a way as illustrated in FIG. 7.

In some instances, the change of the chunk size 189 of the command 185 from the chunk size 188 of a prior command 184 is small; and when the preferred size of the first buffer 130 is determined in a way as illustrated in FIG. 7, the preferred size of the first buffer 130 as calculated from the chunk size 189 of the current command 185 can be the same as the preferred size of the first buffer 130 as calculated from the chunk size 188 of the prior command 184. Thus, no change is necessary in view of the chunk size 189 of the current command 185.

In some instances, when the preferred size of the first buffer 130 is determined in a way as illustrated in FIG. 7, the preferred size of the first buffer 130 as calculated from the chunk size 189 of the current command 185 can be different from the preferred size of the first buffer 130 as calculated from the chunk size 188 of the prior command 184, even though the change of the chunk size 189 of the command 185 from the chunk size 188 of a prior command 184 is small.

In some implementations, a change in chunk size (e.g., 188, 189) is considered a change of a computation thread that uses the submission queue 140. Thus, the context or access pattern of the prior commands (e.g., 183, . . . , 184) in the submission queue 140 can be considered inapplicable to the new computation thread that starts to use the submission queue 140, regardless of whether the change causes a change to the buffer size 169 of the buffer 130 associated with the submission queue 140.

At block 329, the method includes determining whether to change the first buffer 130 according to the preferred size.

At block 331, the method includes changing the first buffer 130 to the preferred size.

For example, the first buffer 130 can be changed from being implemented using the first subset of the buffer units (e.g., 161, 162, 163, 165, . . . , 166) to being implemented using a second subset, different from the first subset, of the buffer units (e.g., 161, 162, 163, 165, . . . , 166).

For example, the method can further include: maintaining or tracking a pool 124 of free buffer units (e.g., 165, . . . , 166) of the same predetermined buffer unit size 160. For example, the free buffer units (e.g., 165, . . . , 166) can be dynamically allocated from the random access memory 121 or the buffer memory 123.

The first buffer 130 can be implemented via concatenation of buffer units (e.g., 162, 163) of the predetermined buffer unit size 160 using buffer units (e.g., 162, 163) having memory areas that are discontinuous in the buffer memory 123 and/or the random access memory 121. Preferably, memory in each buffer unit (e.g., 162 or 163) is in a contiguous area of the buffer memory 123 and/or the random access memory 121 such that the memory in the buffer unit (e.g., 162 or 163) can be identified using a single physical memory address and the predetermined buffer unit size 160.

For example, the changing of the first buffer 130 at block 331 can include, in response to a decision to enlarge the first buffer 130 to the preferred size: allocating one or more buffer units from the pool 124; and adding the one or more buffer units to the first buffer 130 through buffer concatenation.

For example, the changing of the first buffer 130 at block 331 can include, in response to a decision to reduce the first buffer 130 to the preferred size: removing one or more buffer units from the first buffer 130; and returning the one or more buffer units to the pool 124.

For example, the method can further include: determining that the first submission queue has been idling for a time period longer than a threshold; and in response, returning buffer units allocated to (e.g., used to implement) the first buffer 130 to the pool 124.

For example, the method can further include: storing, in association with the first buffer 130, metadata identifying: the chunk size 189 of the data chunk used by the command 185; and physical memory addresses of memories of buffer units (e.g., the second subset) allocated to the first buffer 130. The memories of the buffer units allocated to the first buffer 130 can be discontinuous in the random access memory 121 (or buffer memory 123). The metadata can be further configured to identify logical block addressing (LBA) addresses of data in the first buffer 130. In some implementations, each of the submission queues (e.g., 141 or 143) or queue pairs (e.g., 131 or 133) is allocated a dedicated portion of memory to store the metadata of a buffer (e.g., 132, or 134) allocated for the respective submission queue (e.g., 141 or 143); and the metadata can optionally indicate that the respective buffer (e.g., 132, or 134) has a buffer size of zero.

As in the method of FIG. 17, the predetermined buffer unit size 160 can be a multiple of a size of user data 171 provided an error correction code circuit 173 of the memory sub-system 101 from decoding one codeword (e.g., 175 as in FIG. 6). Further, the predetermined buffer unit size 160 is also a multiple of a size of a storage capacity represented by one logical block addressing (LBA) address specified in the command (e.g., 185) (e.g., an LBA data size). The buffer capacity of the preferred size can be configured to store a predetermined number of data chunks (e.g., 4 data chunks), each having the chunk size 189 of the command 185.

The buffers as managed using the method of FIG. 17 and/or FIG. 18 can be used in speculative prefetching, as in the method of FIG. 19.

At block 341, the method of FIG. 19 includes retrieving, from a first submission queue 140, a first command (e.g., 183, 184, or 185) communicated to a memory sub-system 101 from a host system 102. The first command is configured with a first address (e.g., 211) to access a storage medium (e.g., memory cells 114) of the memory sub-system 101.

For example, the memory sub-system 101 can have a local memory 119 that is not addressable by the host system 102 for access over the computer bus or connection 107 between the host system 102 and the memory sub-system 101. The storage medium (e.g., implemented via NAND memory cells 114) of the memory sub-system 101 can be addressable by the host system 102 using logical block addressing (LBA) addresses for access over the computer bus or connection 107 (e.g., a PCIe connection) using queue pairs (e.g., 131, 133, . . . , 135) according to a non-volatile memory express (NVMe) standard.

At block 343, the method includes determining, based at least in part on the first command (e.g., 184), that a second address configured in a second command (e.g., 185) following the first command (e.g., 184) in communication via the first submission queue 140 from the host system 102 to the memory sub-system 101 is predictable.

At block 345, the method includes predicting a third address (e.g., 241, 243, or 245) according to the first address (e.g., 211) configured in the first command (e.g., 184).

For example, the prediction 207 can be as illustrated in FIG. 15.

At block 347, the method includes retrieving (e.g., fetching 203), from the storage medium of the memory sub-system 101 and according to the third address (e.g., 241, 243, or 245), a data chunk (e.g., 242, 244, or 246).

At block 349, the method includes buffering, in the memory sub-system 101, the data chunk (e.g., 242, 244, or 246).

For example, the data chunk (e.g., 242, 244, or 246) can be buffered in the local memory 119 (e.g., a random access memory, such as a dynamic random access memory (DRAM) or a static random access memory (SRAM)) in the memory sub-system 101.

For example, a buffer (e.g., 130) can be allocated specifically for the buffering of one or more data chunks (e.g., 242, 244, or 246) prefetched for the first submission queue 140; and the buffer (e.g., 130) can be allocated and managed using the method of FIG. 17 and/or the method of FIG. 18.

At block 351, the method includes retrieving, from the first submission queue 140 and after the buffering at block 351, the second command (e.g., 185).

For example, in some instances, there is a time gap between the host system 102 providing the first command (e.g., 184) and the host system 102 providing the second command (e.g., 185) in the same submission queue 140. The memory sub-system 101 is configured to perform the prefetching 205 during the gap such that the latency in responding to the second command (e.g., 185) can be reduced.

In some implementations, there is a time gap between the host system 102 providing the first command (e.g., 184) and the second command (e.g., 185) in the submission queue 140 and the memory sub-system 101 can provide responses to the first command (e.g., 184) and the second command (e.g., 185) (e.g., when the communication bandwidth of the computer bus or connection 107 is being fully utilized for other tasks). Thus, the memory sub-system 101 can fetch the data chunks requested by the first command (e.g., 184) and the second command (e.g., 185) in the buffer 130 for subsequent execution of the commands (e.g., 184 and 185) (e.g., when the communication bandwidth of the computer bus or connection 107 is available for the execution of the commands 184 and 185). In such cases, the data chunks are fetched based on the actual addresses specified in the commands (e.g., 184 and 185) (e.g., not based on predictions 207 of the addresses of the commands 184 and 185).

For example, the method can further include: allocating a first buffer 130; and associating the first buffer 130 specifically with the first submission queue 140 among a plurality of submission queues 141, 143, . . . , 145 configured to facilitate communications between the host system 102 and the memory sub-system 101. The buffering of the data chunk (e.g., 242, 244, or 246) at block 349 can be in the first buffer 130, as in FIG. 14 or FIG. 15.

For example, the method can further include: turning on a prefetching mode for the first submission queue 140 in response to a determination, based on the first command 184 from the first submission queue 140, that the second address (e.g., in the second command 185) is predictable. In response to turning on the prefetching mode for the first submission queue 140, the first buffer 130 can be dynamically allocated (e.g., from the local memory 119, buffer memory 123, or random access memory 121).

For example, the method can further include: detecting, based on the first command, a change 191 in chunk size in commands (e.g., 184, 185) retrieved from the first submission queue 140. The size change 191 can be considered an indicator of the starting or resuming of the operations of a different computing thread now running in a processor core (e.g., 151, 153, or 155) that is assigned to use the first submission queue 140. In response, the memory sub-system 101 can assume that the subsequent accesses in the computing thread is sequential or near sequential (and thus predictable).

For example, the method can further include: determining that the first submission queue 140 has been idling for a period of time longer than a threshold and that the first command is received following the period of time without an intervening command between the first command and the period of time. The period of idling can be considered by the memory sub-system 101 the starting or resuming of the operations of a different computing thread now running in a processor core (e.g., 151, 153, or 155) that is assigned to use the first submission queue 140. In response, the memory sub-system 101 can assume that the subsequent accesses in the computing thread is sequential or near sequential (and thus predictable).

For example, the prefetching mode can be already on for the first submission queue 140 at a time of the retrieving of the first command 184. The memory sub-system 101 can keep the prefetching mode on for the first submission queue 140 in response to a determination, based on the first command 184, that the second address is predictable.

For example, the determination that the second address of the second command 185 is predictable can be based on a determination that the first address 211 specified in the first command 184 has been predicted for the first submission queue 140 before the retrieving of the first command 184.

For example, the determination that the second address of the second command 185 is predictable can be based on a determination that the first address 211 specified in the first command 184 is predictable from one or more commands (e.g., 183) received from the first submission queue 140 before the first command 185.

For example, the method can further include: turning off a prefetching mode for the first submission queue 140 in response to a determination, based on the second command 185, that the second address specified in the second command 185 is not predicted for the first submission queue 140 before the retrieving of the second command 185.

For example, the method can further include: keeping the prefetching mode on for the first submission queue 140 in response to a determination, based on the second command 185, that the second address specified in the second command 185 has been predicted for the first submission queue 140 before the retrieving of the second command 185, or is predictable from the first address 211 in the first command 184 received before the second command 185.

A non-transitory computer storage medium can be used to store instructions programmed to implement the buffer managers 113 in the host system 102 and the memory sub-system 101. When the instructions are executed by the processing device 118, the controller 115, and the processing device 117, the instructions cause the host system 102 and/or the memory sub-system 101 to perform the methods discussed above.

Figure 20:
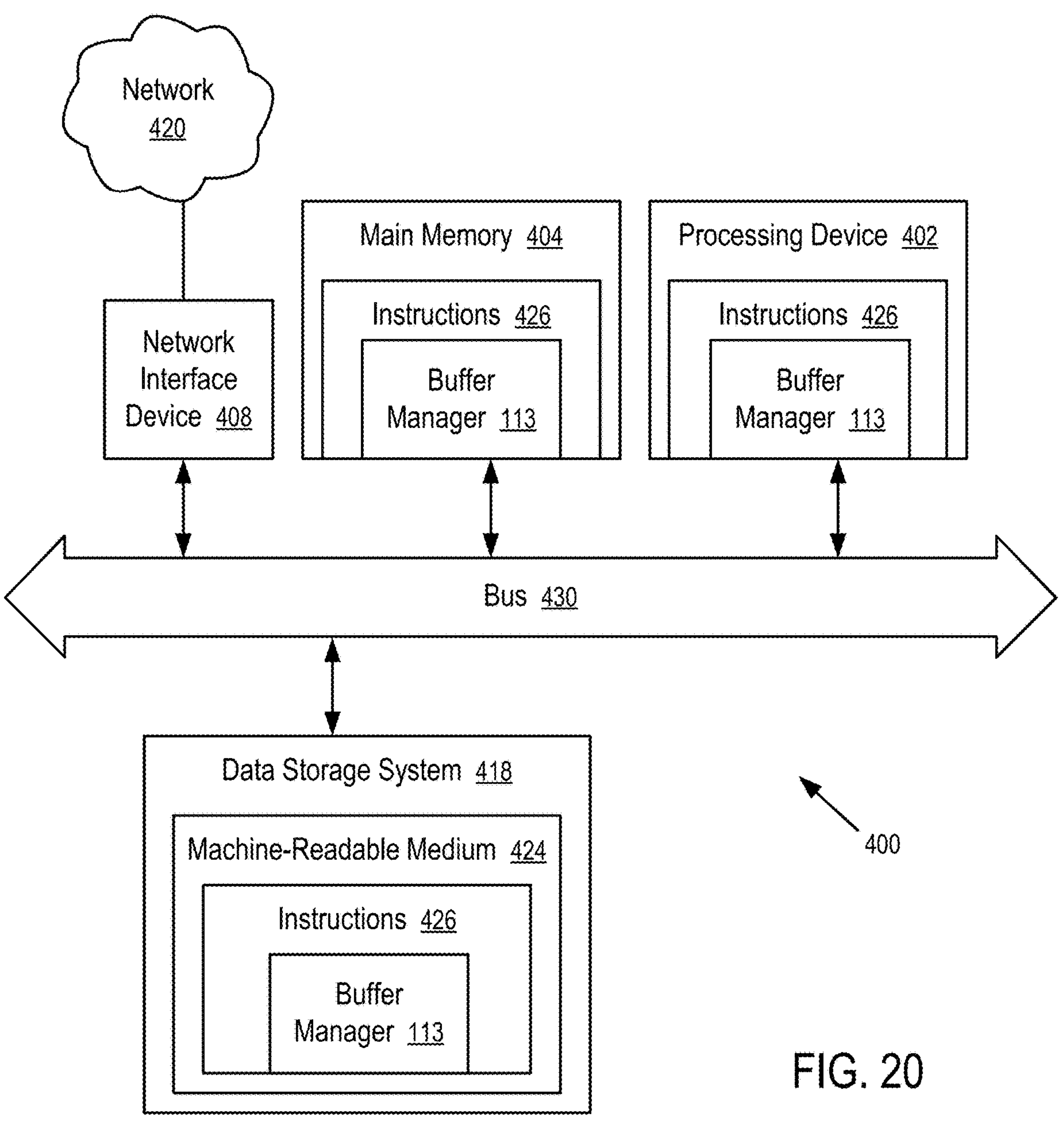
FIG. 20 is a block diagram of an example computer system in which embodiments of the present disclosure can operate.

FIG. 20 illustrates an example machine of a computer system 400 within which a set of instructions, for causing the machine to perform any one or more of the methodologies discussed herein, can be executed. In some embodiments, the computer system 400 can correspond to a host system (e.g., the host system 102 of FIG. 1) that includes, is coupled to, or utilizes a memory sub-system (e.g., the memory sub-system 101 of FIG. 1) or can be used to perform the operations of buffer managers 113 (e.g., to execute instructions to perform operations corresponding to the buffer managers 113 described with reference to FIGS. 1-19). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 101 of FIG. 1.

In one embodiment, the instructions 426 include instructions to implement functionality corresponding to the buffer managers 113 described with reference to FIGS. 1-19. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

retrieving, from a first submission queue, a first command communicated to a memory sub-system from a host system, wherein the first command is configured with a first address to access a storage medium of the memory sub-system;

determining, based at least in part on the first command, that a second address configured in a second command is predictable;

retrieving, from the storage medium of the memory sub-system, a data chunk;

buffering, in the memory sub-system, the data chunk;

retrieving, from the first submission queue and after the buffering, the second command;

allocating a first buffer; and associating the first buffer specifically with the first submission queue among a plurality of submission queues configured to facilitate communications between the host system and the memory sub-system;

wherein the buffering of the data chunk is in the first buffer.

2. The method of claim 1, further comprising:

turning on a prefetching mode for the first submission queue in response to a determination, based on the first command, that the second address is predictable.

3. The method of claim 2, wherein the allocating of the first buffer is in response to the turning on the prefetching mode for the first submission queue.

4. The method of claim 3, further comprising:

detecting, based on the first command, a change in chunk size in commands retrieved from the first submission queue;

wherein the determination that the second address is predictable is based on the change in chunk size being detected.

5. The method of claim 3, further comprising:

determining that the first submission queue has been idling for a period of time longer than a threshold;

wherein the determination that the second address is predictable is based on the first command being received following the period of time without a command between the first command and the period of time.

6. The method of claim 1, wherein a prefetching mode is on for the first submission queue at a time of the retrieving of the first command; and the method further comprises:

keeping the prefetching mode on for the first submission queue in response to a determination, based on the first command, that the second address is predictable.

7. The method of claim 6, wherein the determination that the second address is predictable is based on a determination that the first address is predicted for the first submission queue before the retrieving of the first command.

8. The method of claim 1, wherein the determining that the second address is predictable is based on a determination that the first address is predictable from one or more commands received from the first submission queue before the first command.

9. The method of claim 1, further comprising:

turning off a prefetching mode for the first submission queue in response to a determination, based on the second command, that the second address is not predicted for the first submission queue before the retrieving of the second command.

10. A memory sub-system, comprising:

a random access memory;

a storage medium having a storage capacity accessible to a host system through commands communicated via a plurality of submission queues to the memory sub-system; and a controller configured to:

retrieve, from a first submission queue among the plurality of submission queues, a first command configured with a first address to access the storage medium;

determine, based at least in part on the first command, that a second address configured in a second command following the first command in communication via the first submission queue from the host system to the memory sub-system is predictable;

retrieve a data chunk;

buffer, in the random access memory, the data chunk;

retrieve, from the first submission queue and after the data chunk is buffered in the random access memory, the second command;

allocate a first buffer from the random access memory; and associate the first buffer specifically with the first submission queue among a plurality of submission queues configured to facilitate communications between the host system and the memory sub-system;

wherein the data chunk is buffered in the first buffer.

11. The memory sub-system of claim 10, further comprising:

turning on a prefetching mode for the first submission queue in response to a determination, based on the first command, that the second address is predictable;

wherein the allocating of the first buffer is in response to the turning on the prefetching mode for the first submission queue.

12. The memory sub-system of claim 11, wherein the determination that the second address is predictable is based on:

a change in chunk size in commands retrieved from the first submission queue; or the first command being received following a period of time of idling, longer than a threshold, without a command between the first command and the period of time.

13. The memory sub-system of claim 10, wherein a prefetching mode is on for the first submission queue at a time of retrieving the first command from the first submission queue; and the controller is further configured to:

keep the prefetching mode on for the first submission queue in response to a determination that the first address is predicted for the first submission queue before the first command is retrieved from the first submission queue.

14. The memory sub-system of claim 10, wherein the controller is further configured to determine that the second address is predictable based on a determination that the first address is predictable from one or more commands received from the first submission queue before the first command.

15. The memory sub-system of claim 10, wherein the controller is further configured to turn off a prefetching mode for the first submission queue in response to a determination, based on the second command, that the second address is not predicted for the first submission queue before the second command is retrieved from the first submission queue.

16. A non-transitory computer storage medium storing instructions which, when executed in a memory sub-system, cause the memory sub-system to perform a method, comprising:

retrieving, from a first submission queue, a first command communicated to the memory sub-system from a host system, wherein the first command is configured with a first address to access a storage capacity of the memory sub-system;

determining, based at least in part on the first command, that a second address configured in a second command following the first command, is predictable;

predicting a third address according to the first address configured in the first command;

retrieving, from the storage capacity of the memory sub-system, a data chunk into a first buffer;

allocating the first buffer; and associating the first buffer specifically with the first submission queue among a plurality of submission queues configured to facilitate communications between the host system and the memory sub-system.

17. The non-transitory computer storage medium of claim 16, wherein the method further comprises:

turning on a prefetching mode for the first submission queue in response to a determination, based on the first command, that the second address is predictable; and turning off the prefetching mode for the first submission queue in response to a determination, based on the second command, that the second address is not predicted for the first submission queue before the second command is retrieved from the first submission queue.

* * * * *